Nov. 3, 1953
G. A. DUNN
2,657,725
FRUIT PROCESSING MACHINE
Filed April 25, 1949
23 Sheets-Sheet 10
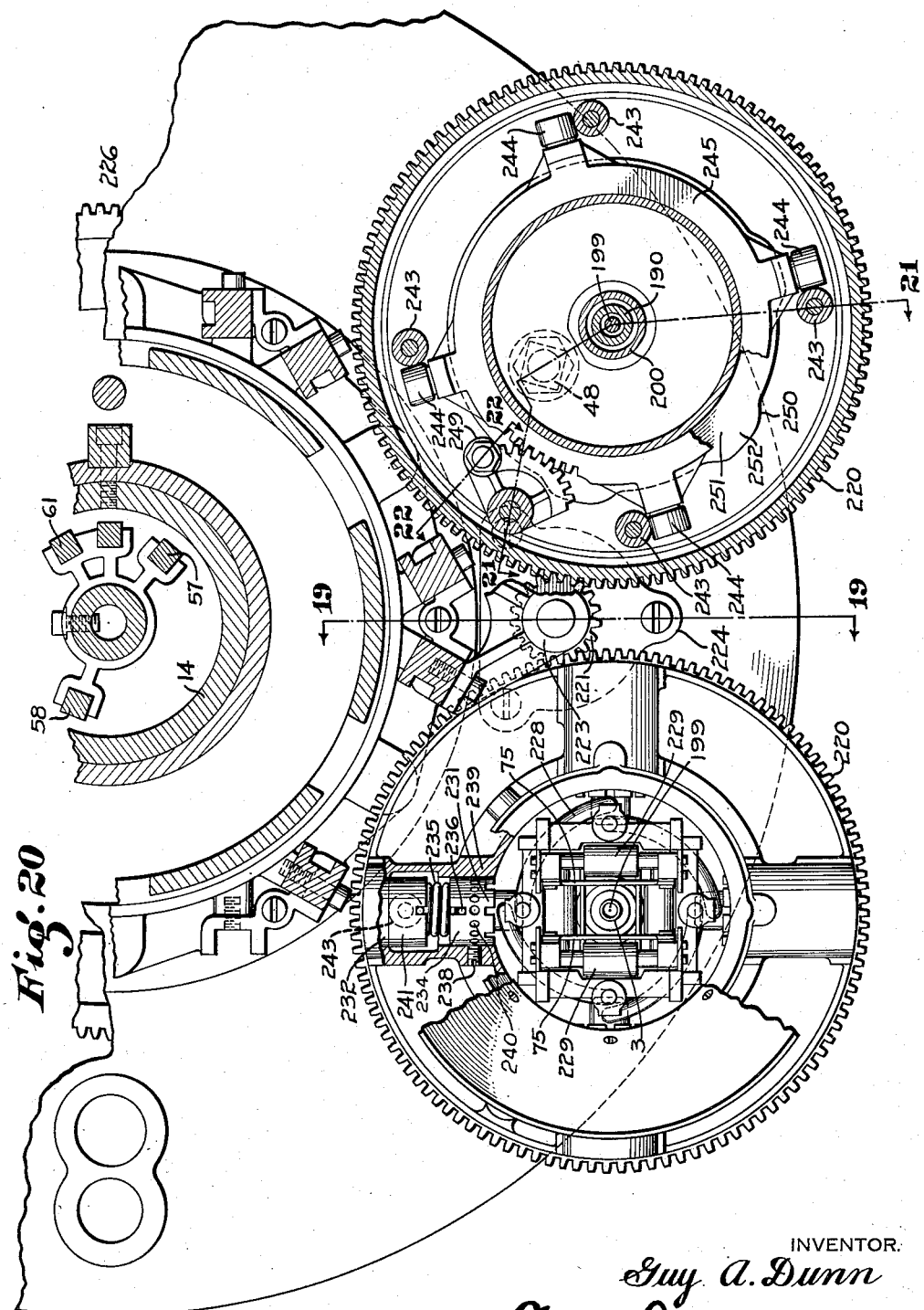
INVENTOR.
Guy A. Dunn
BY Lyon & Lyon
ATTORNEYS.

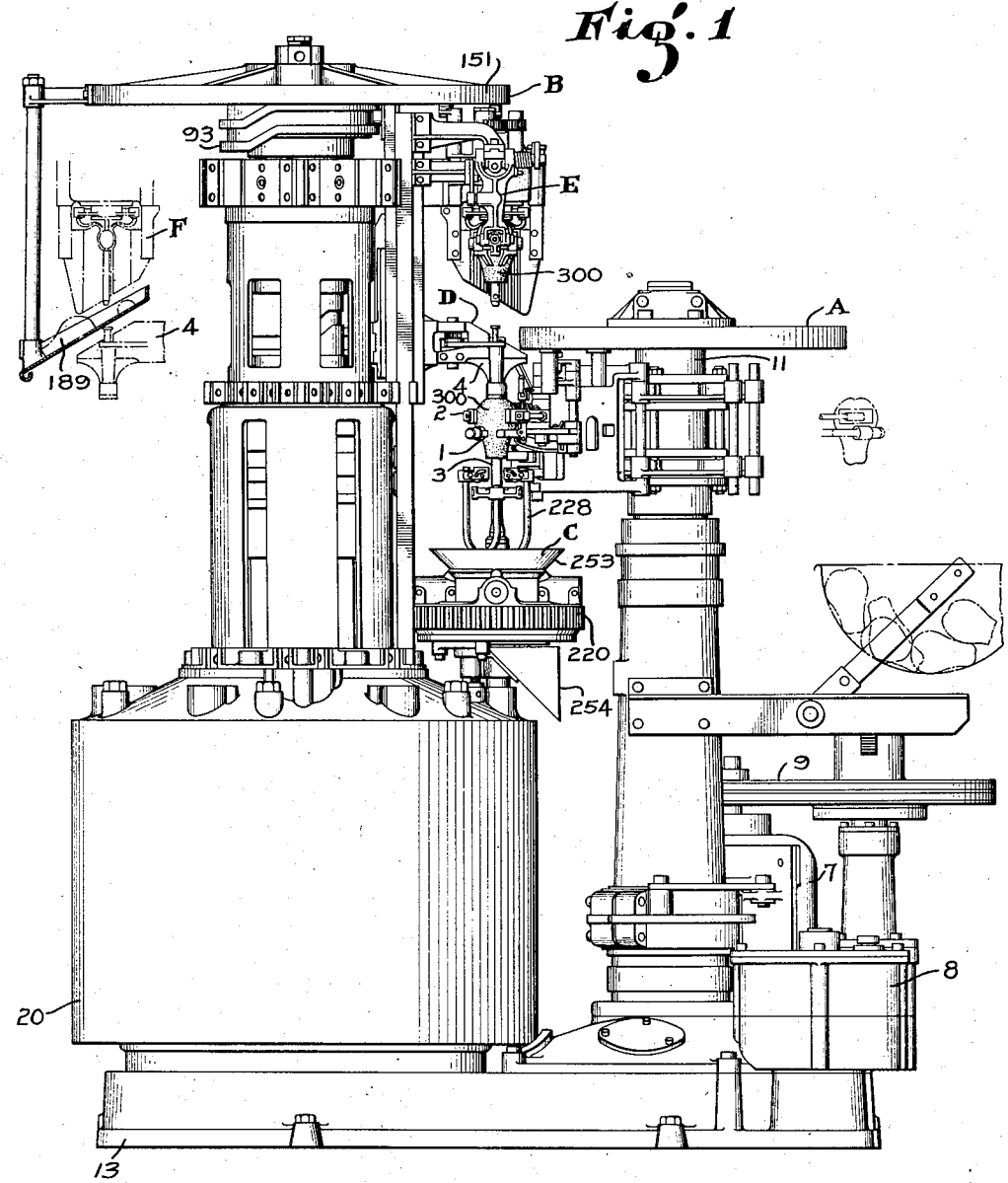

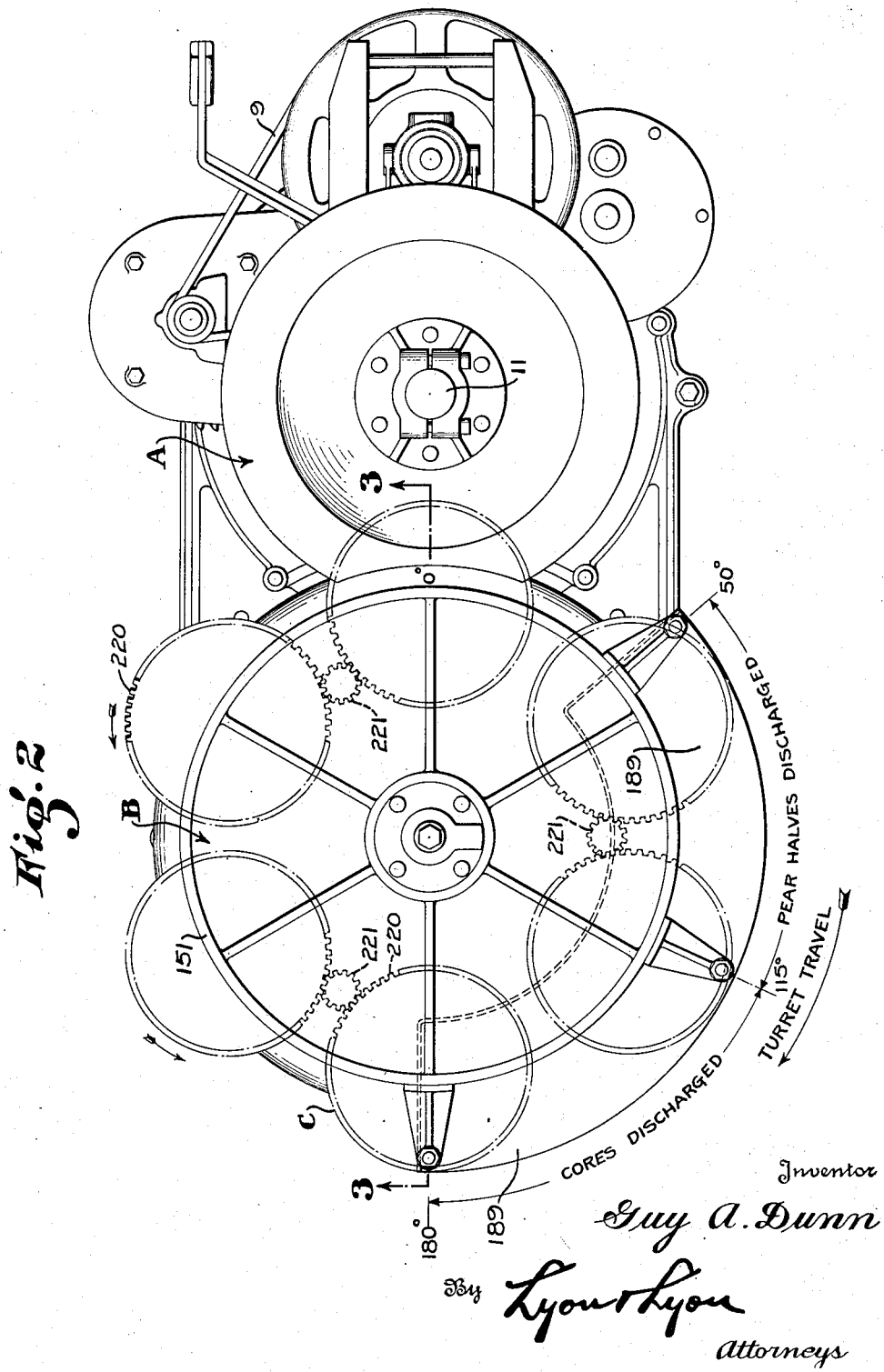

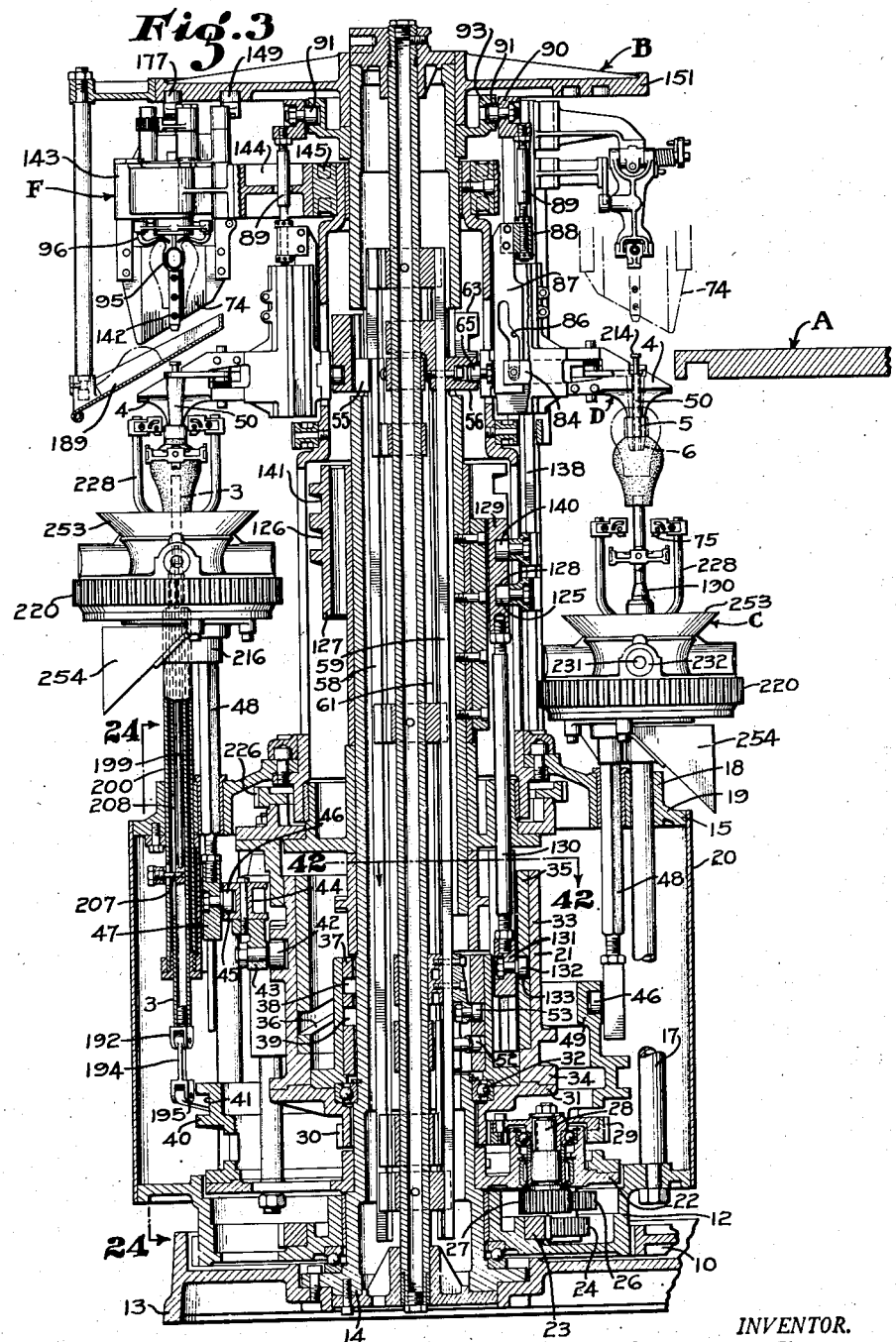

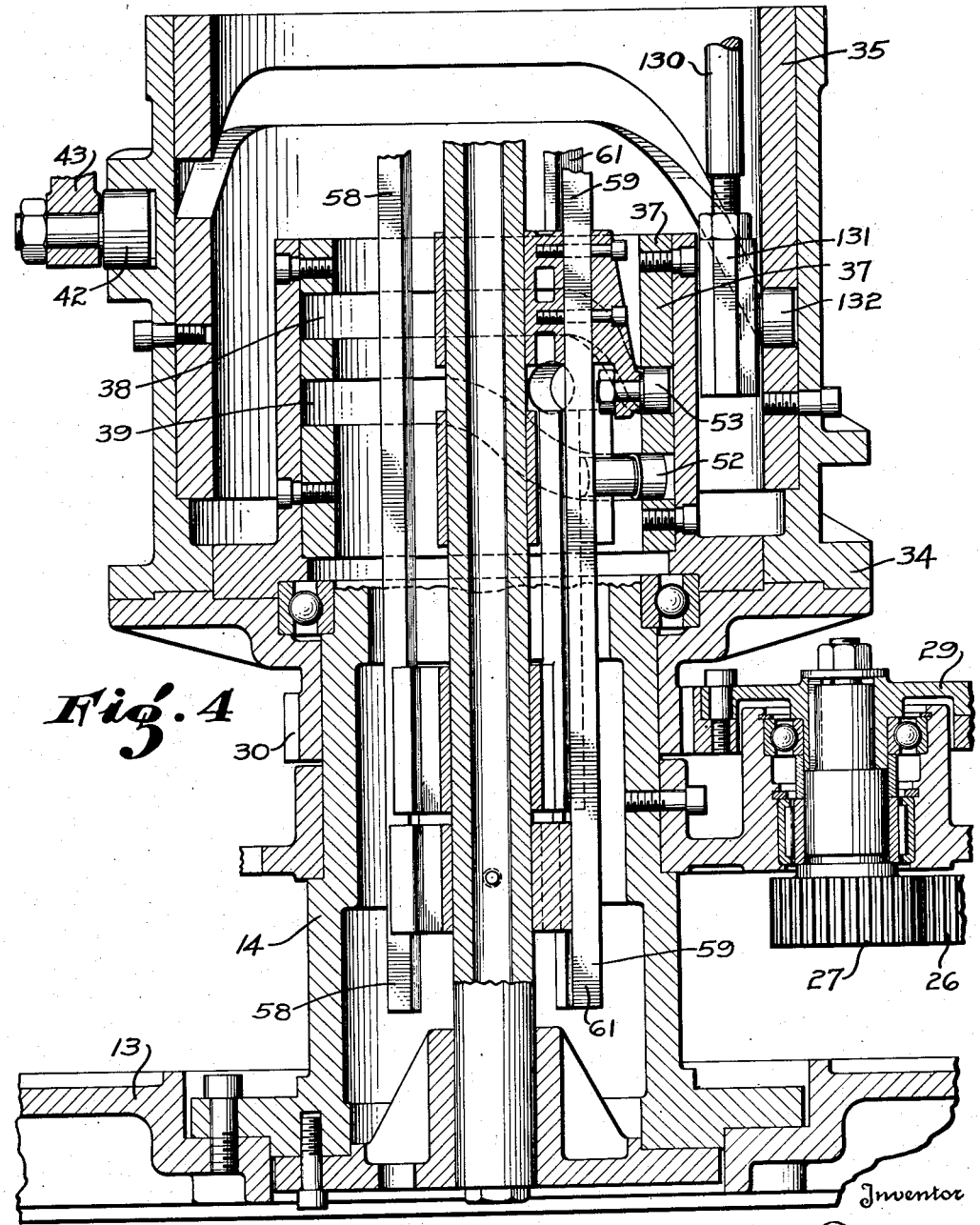

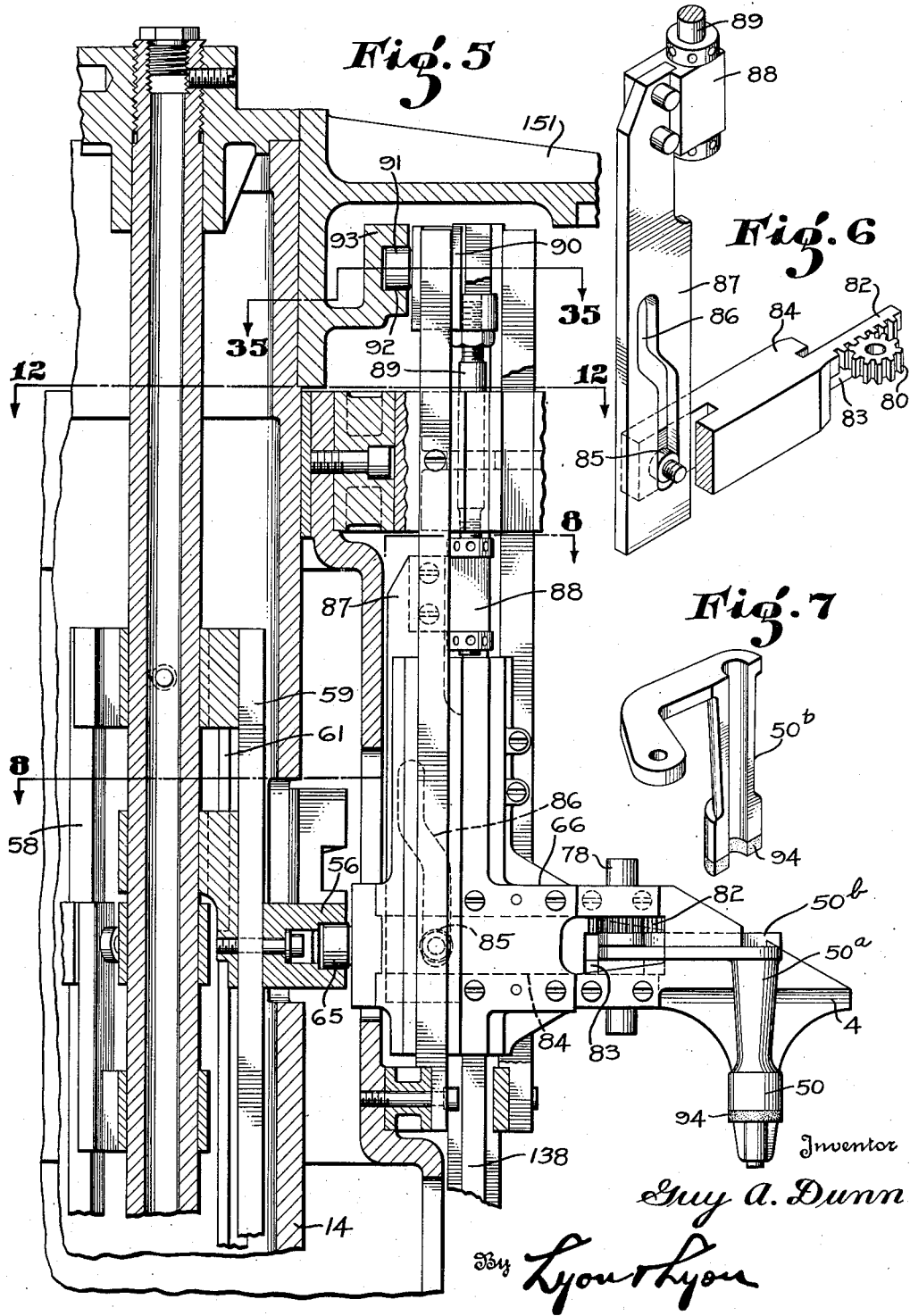

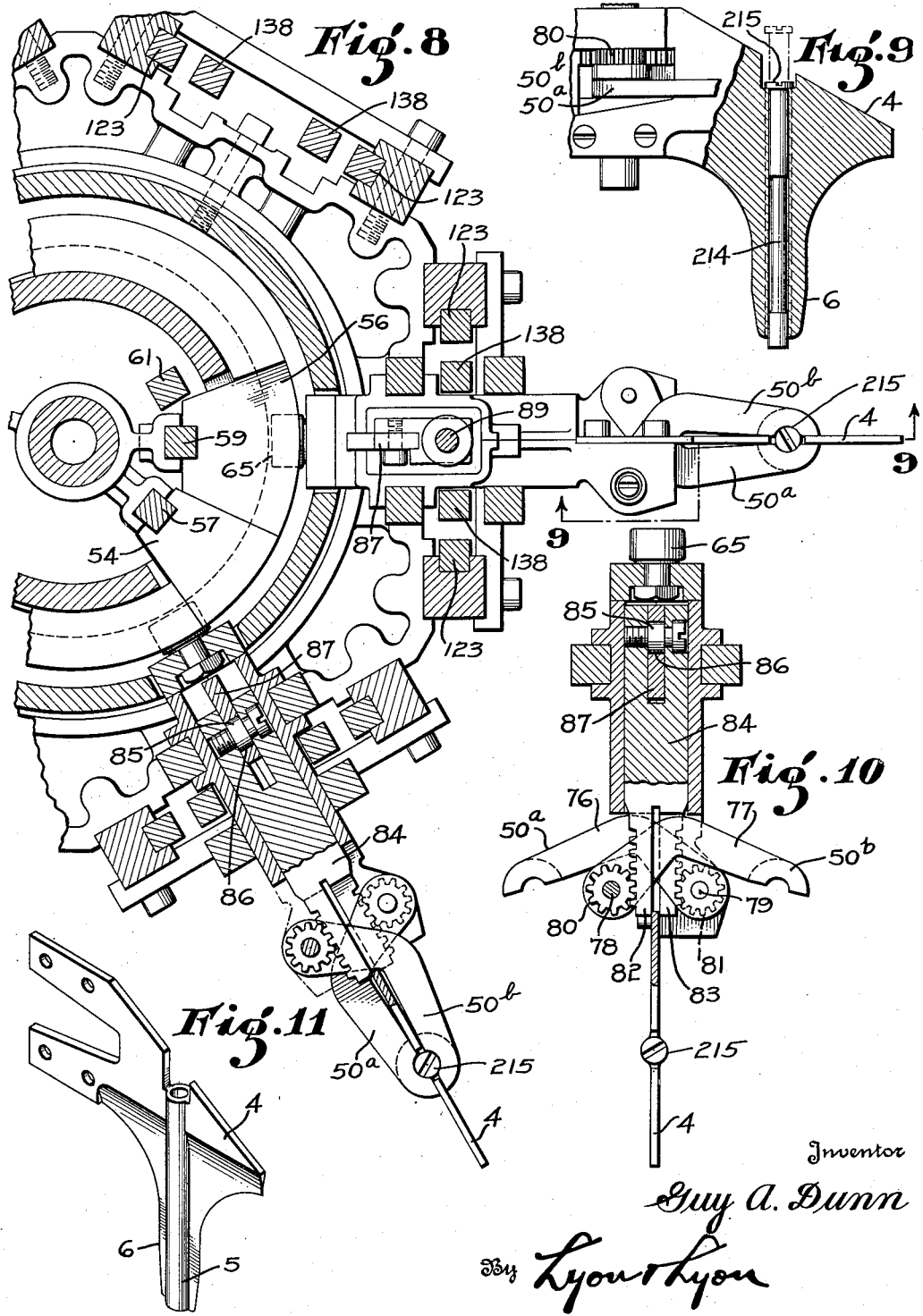

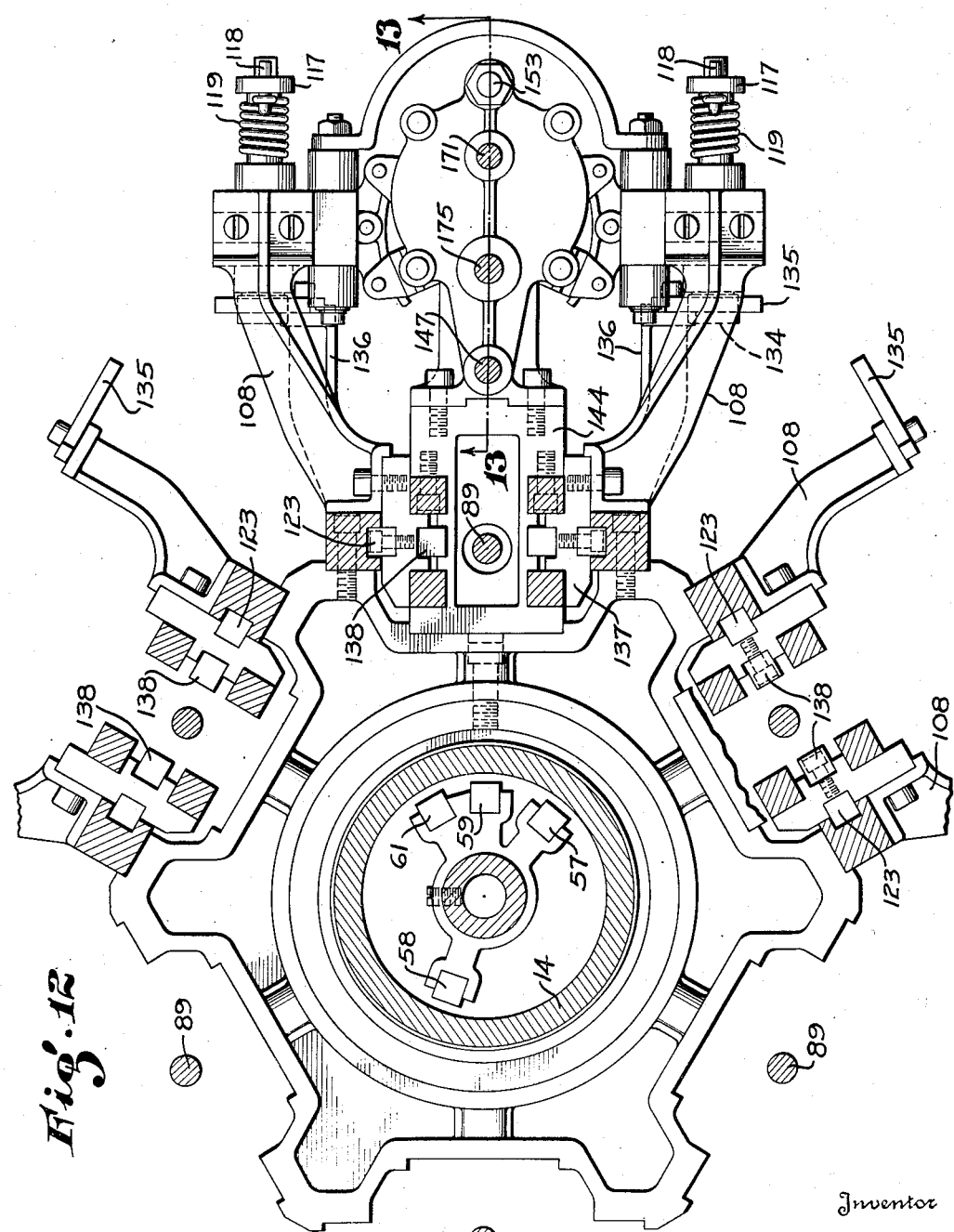

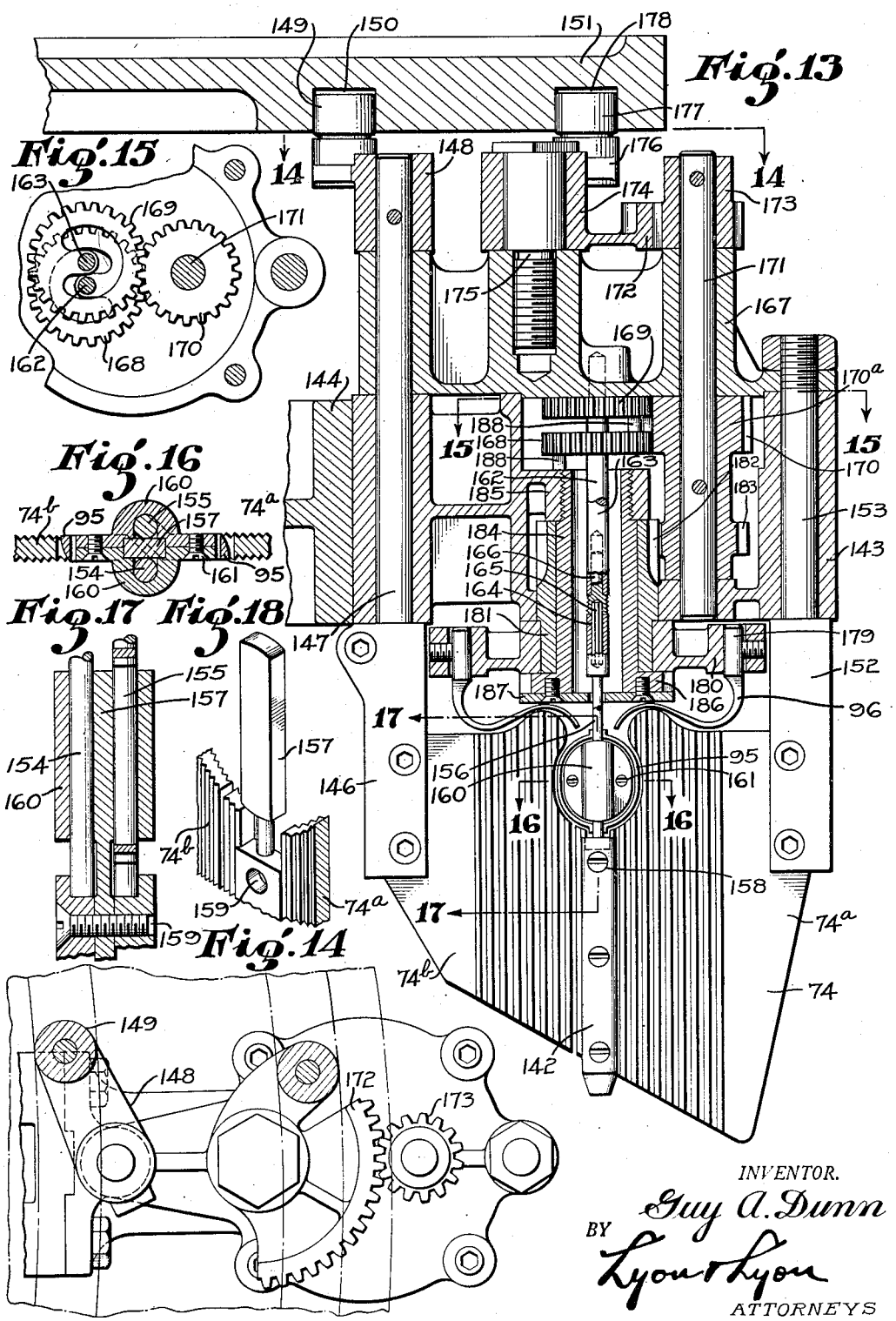

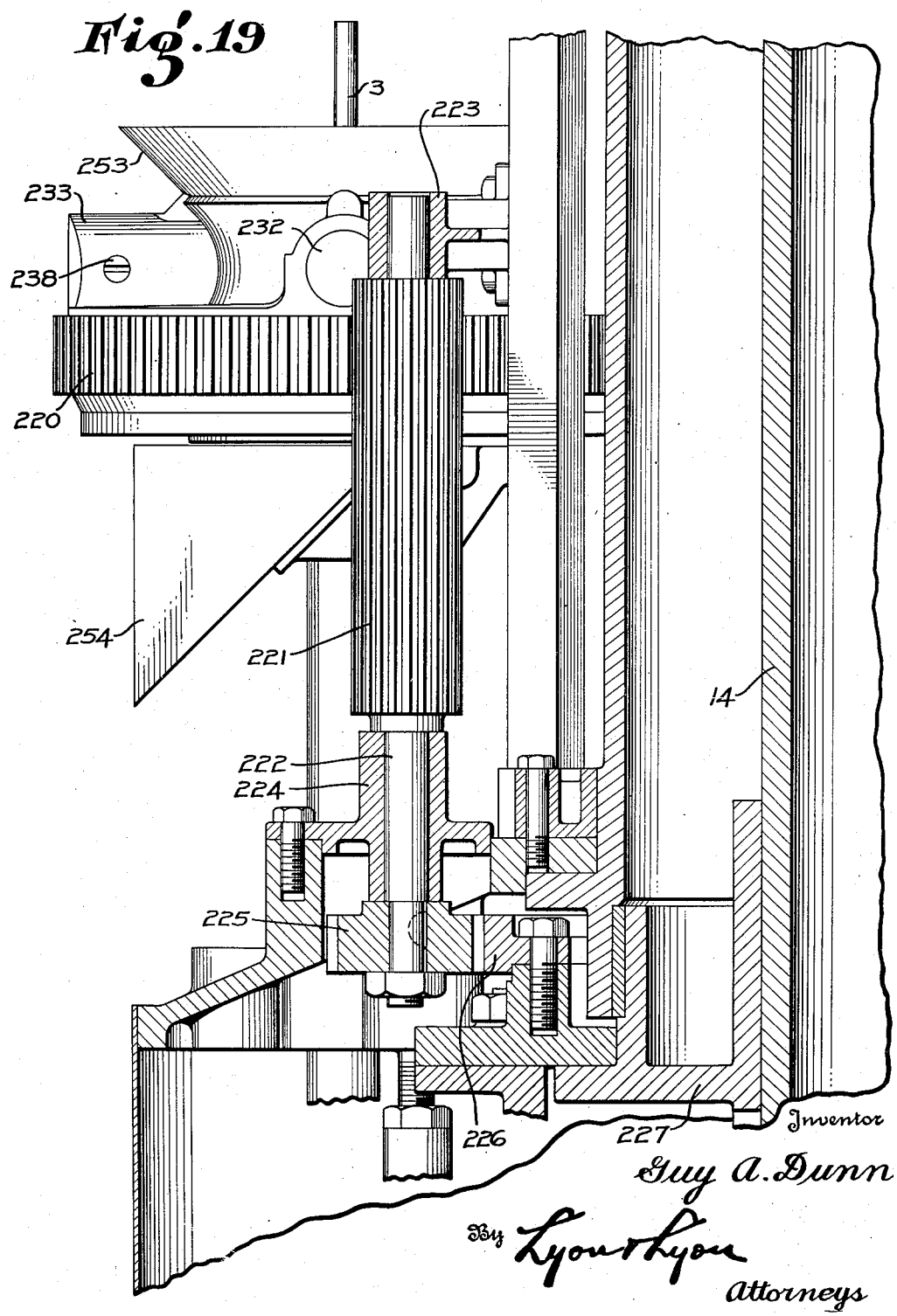

Nov. 3, 1953
G. A. DUNN
2,657,725
FRUIT PROCESSING MACHINE
Filed April 25, 1949
23 Sheets-Sheet 11
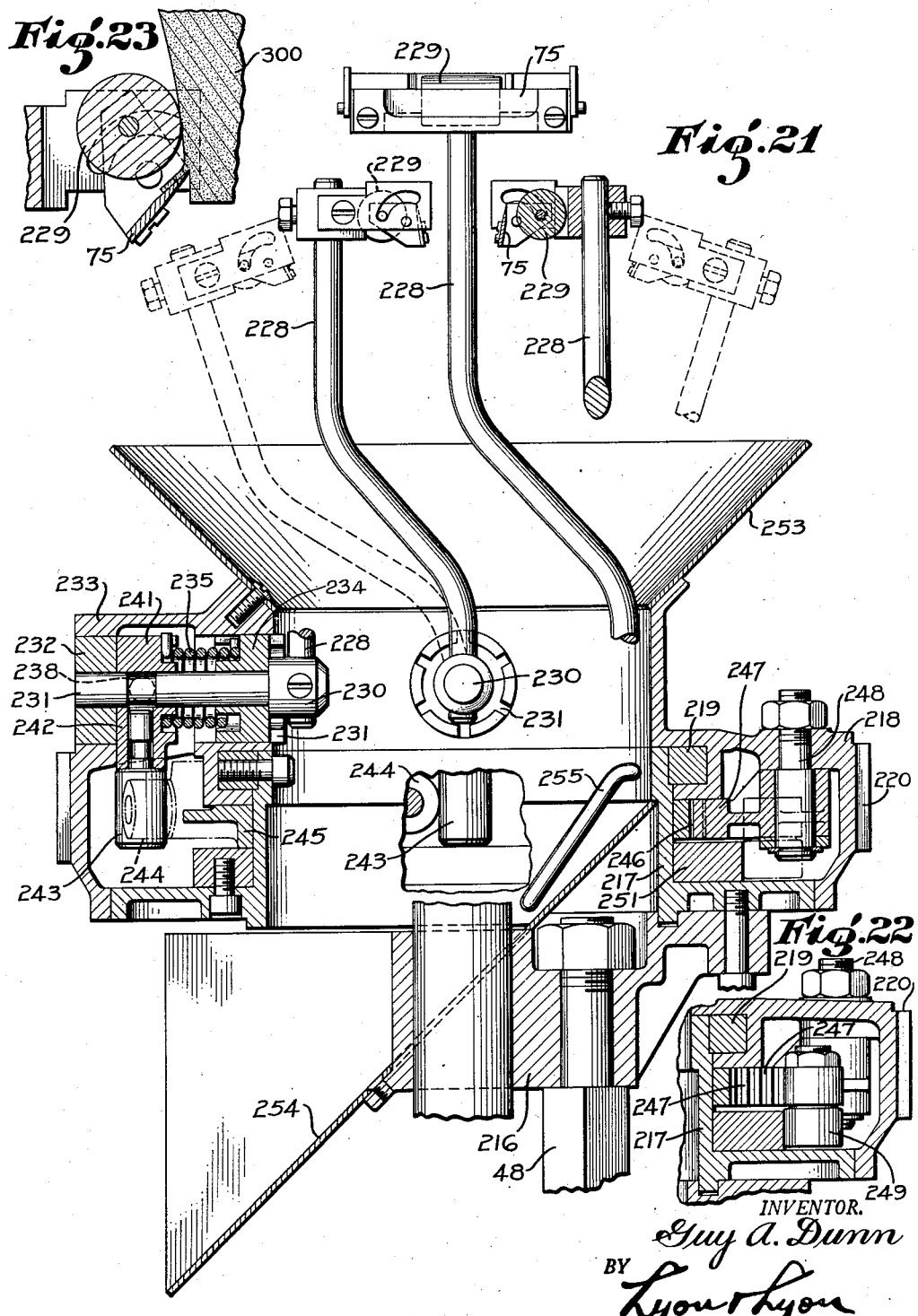
INVENTOR.
Guy A. Dunn
BY
Lyon & Lyon
Attorneys

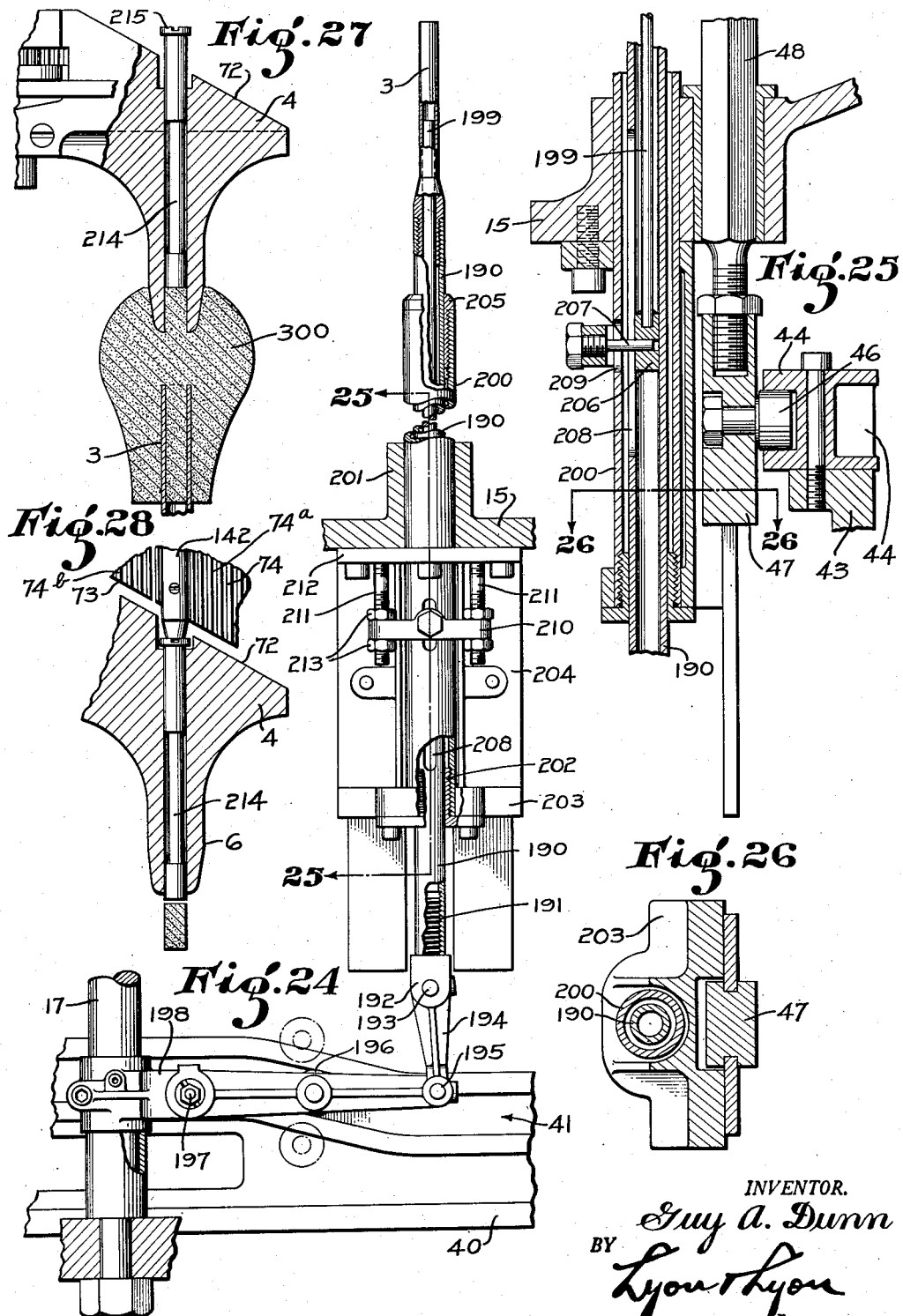

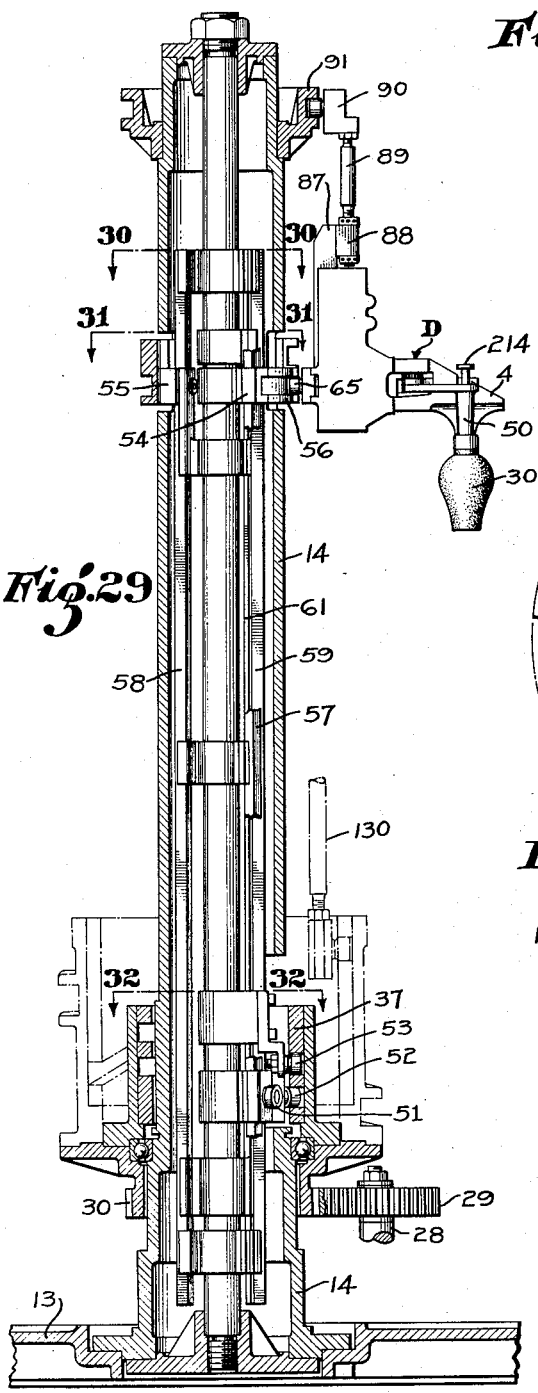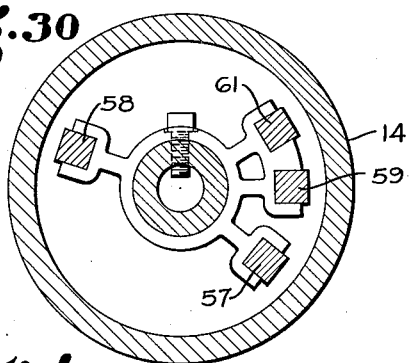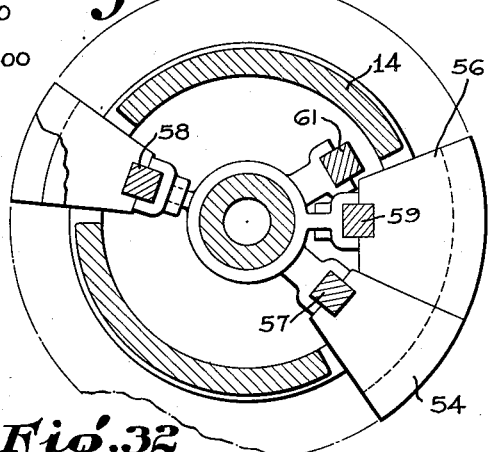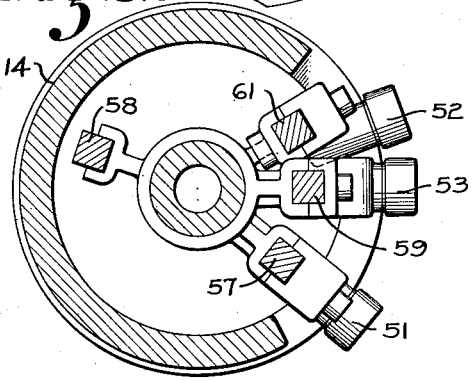

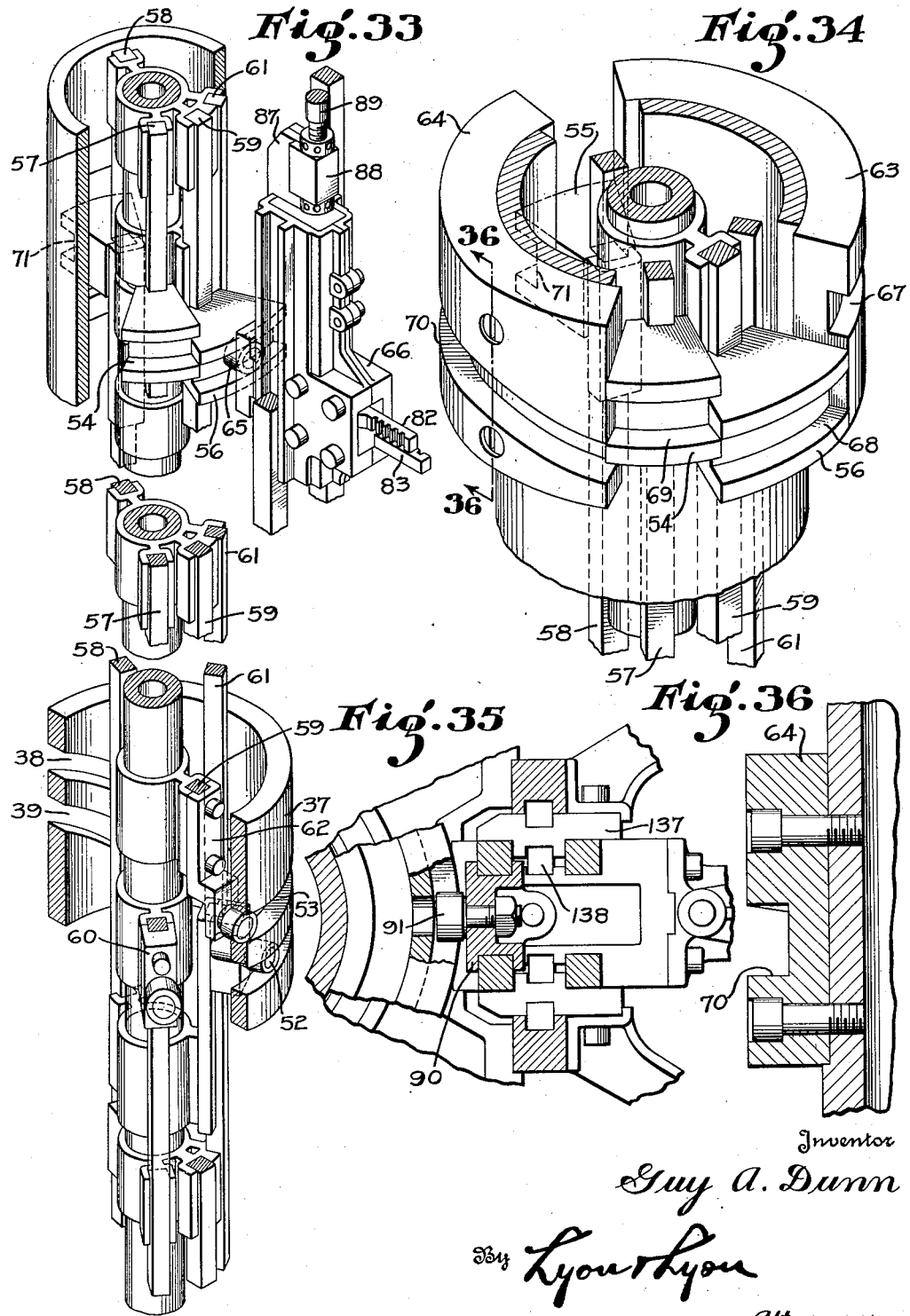

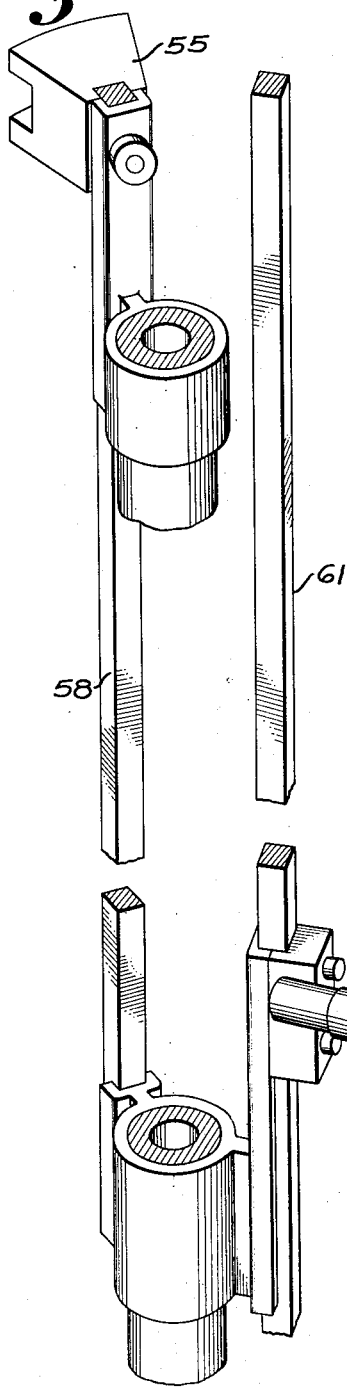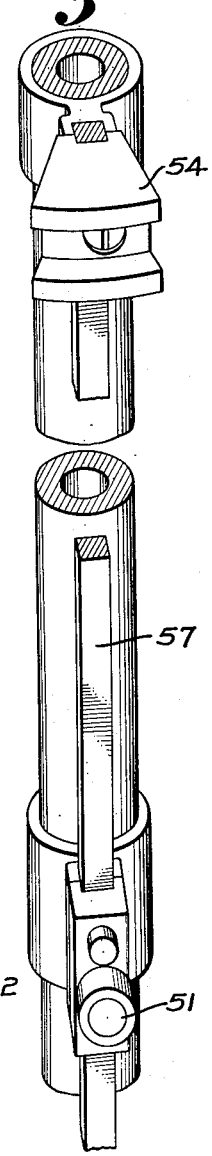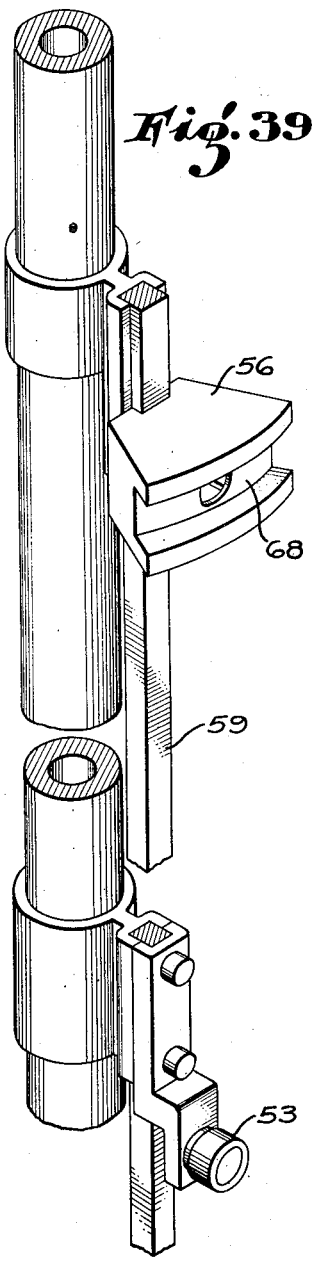

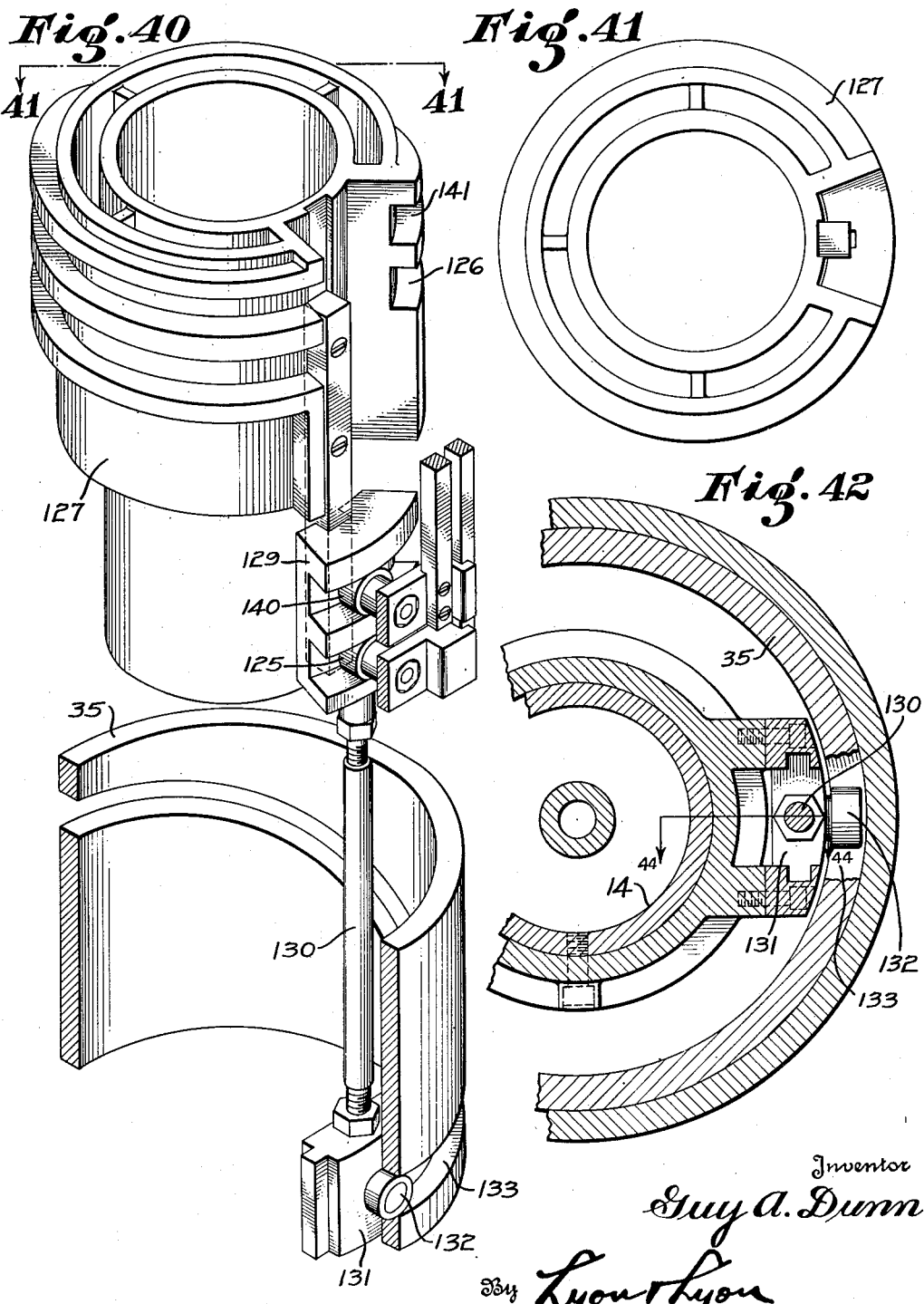

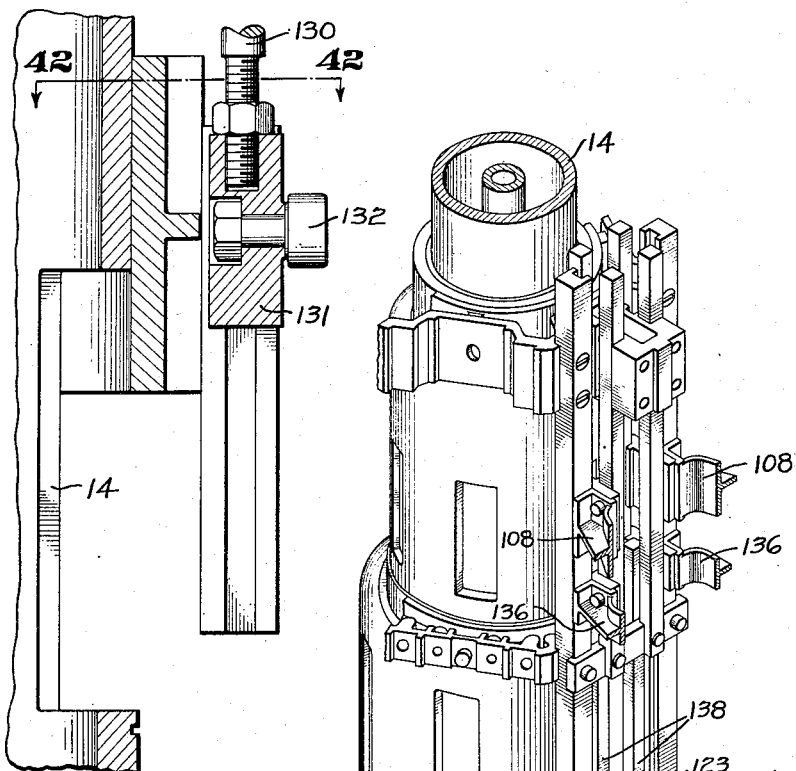
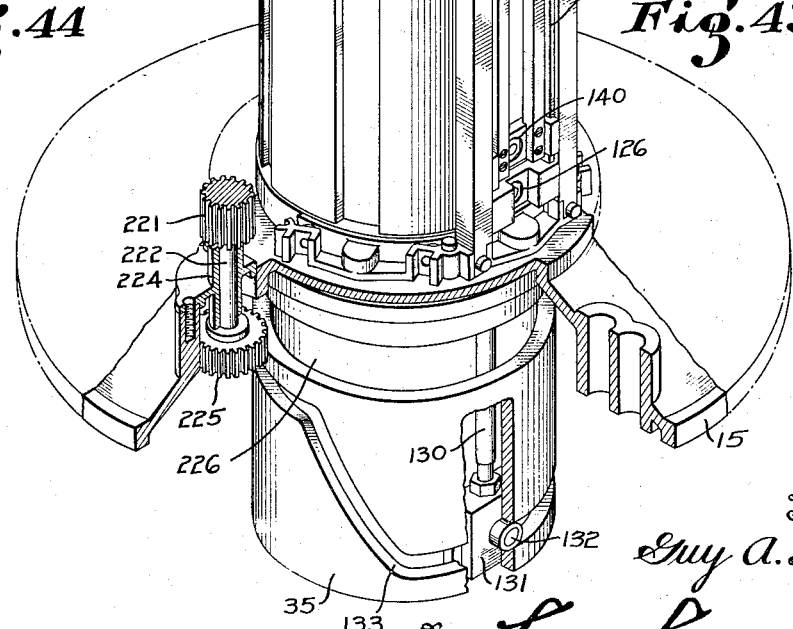

Nov. 3, 1953  G. A. DUNN  2,657,725
FRUIT PROCESSING MACHINE
Filed April 25, 1949  23 Sheets-Sheet 18
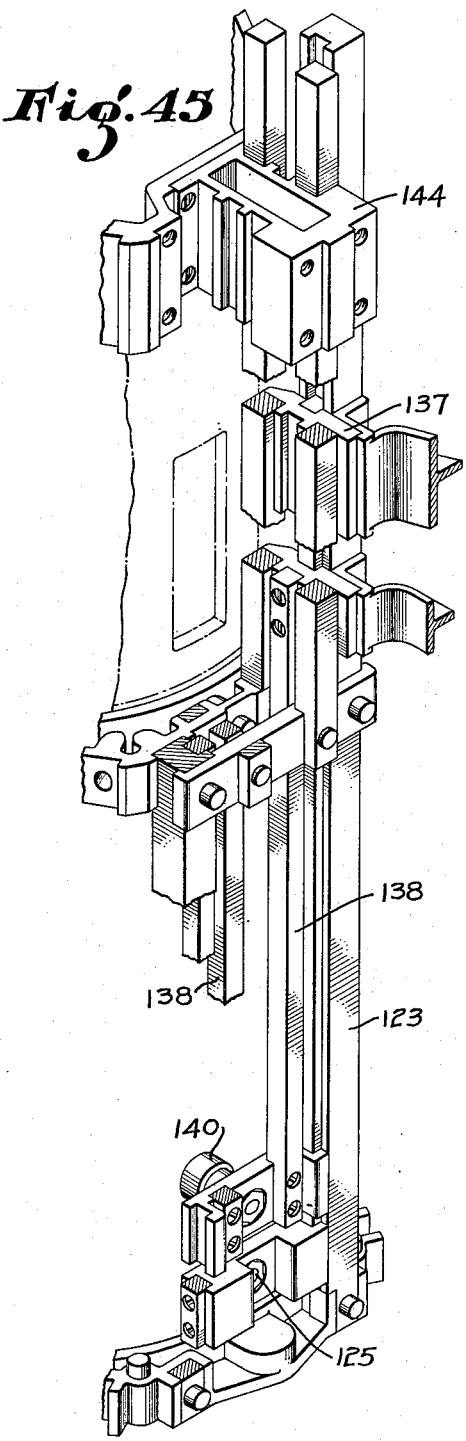
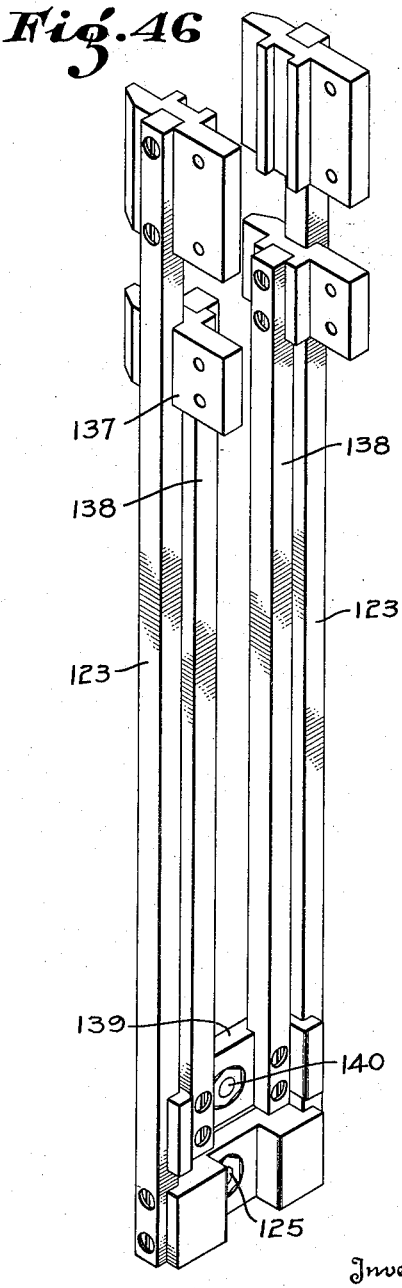
Inventor
Guy A. Dunn
By Lyon & Lyon
Attorneys

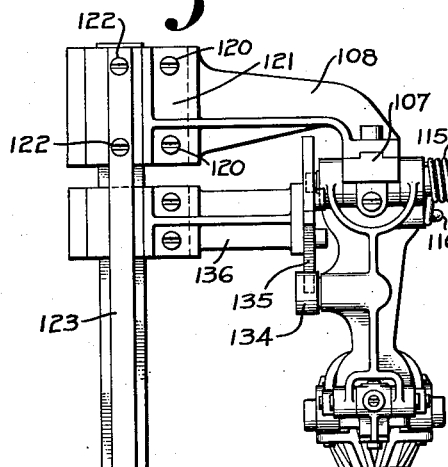

Nov. 3, 1953          G. A. DUNN          2,657,725
FRUIT PROCESSING MACHINE
Filed April 25, 1949          23 Sheets-Sheet 20
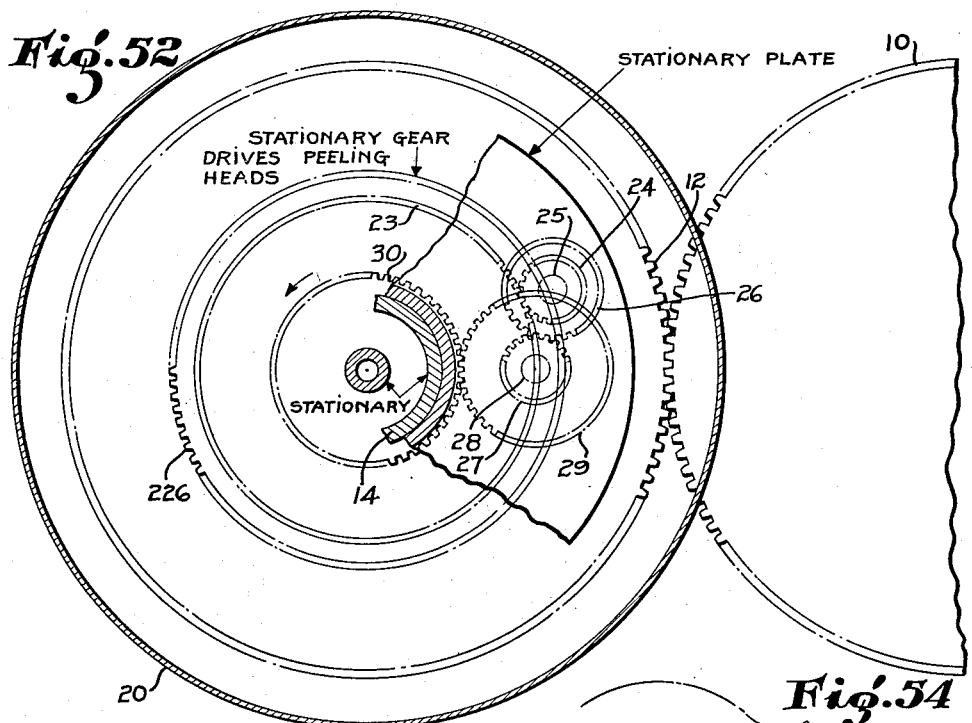
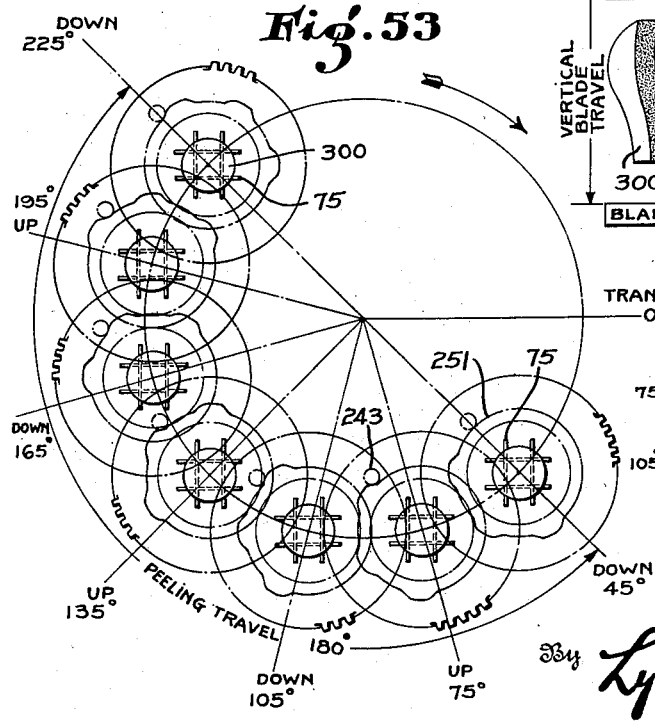
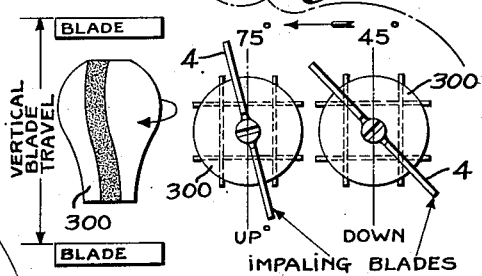
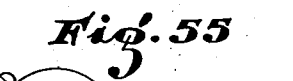
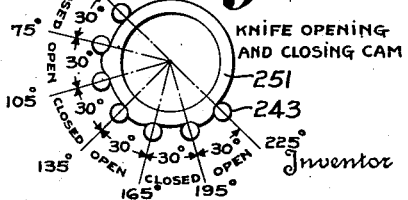
Inventor
Guy A. Dunn
By Lyon & Lyon
Attorneys

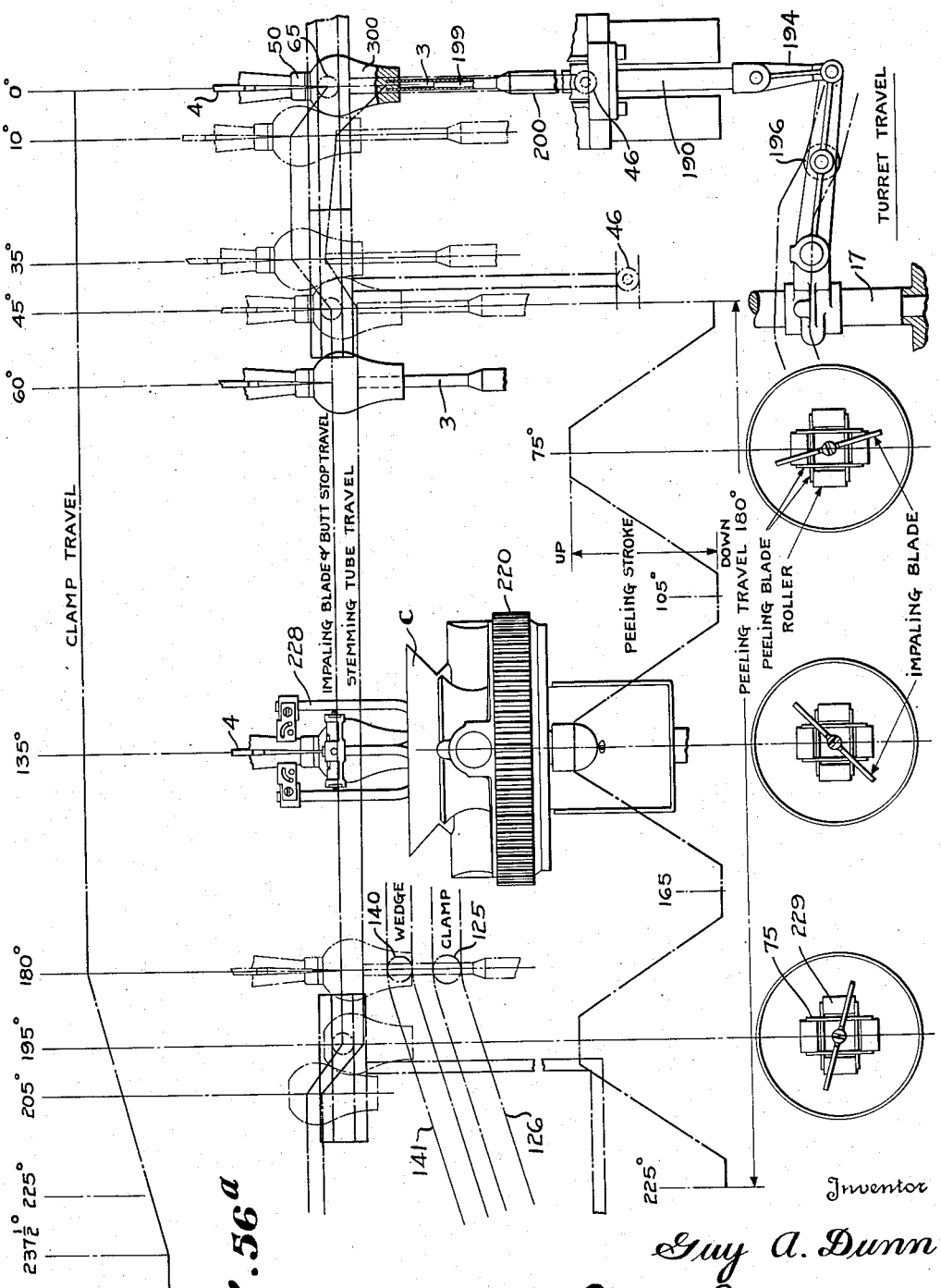

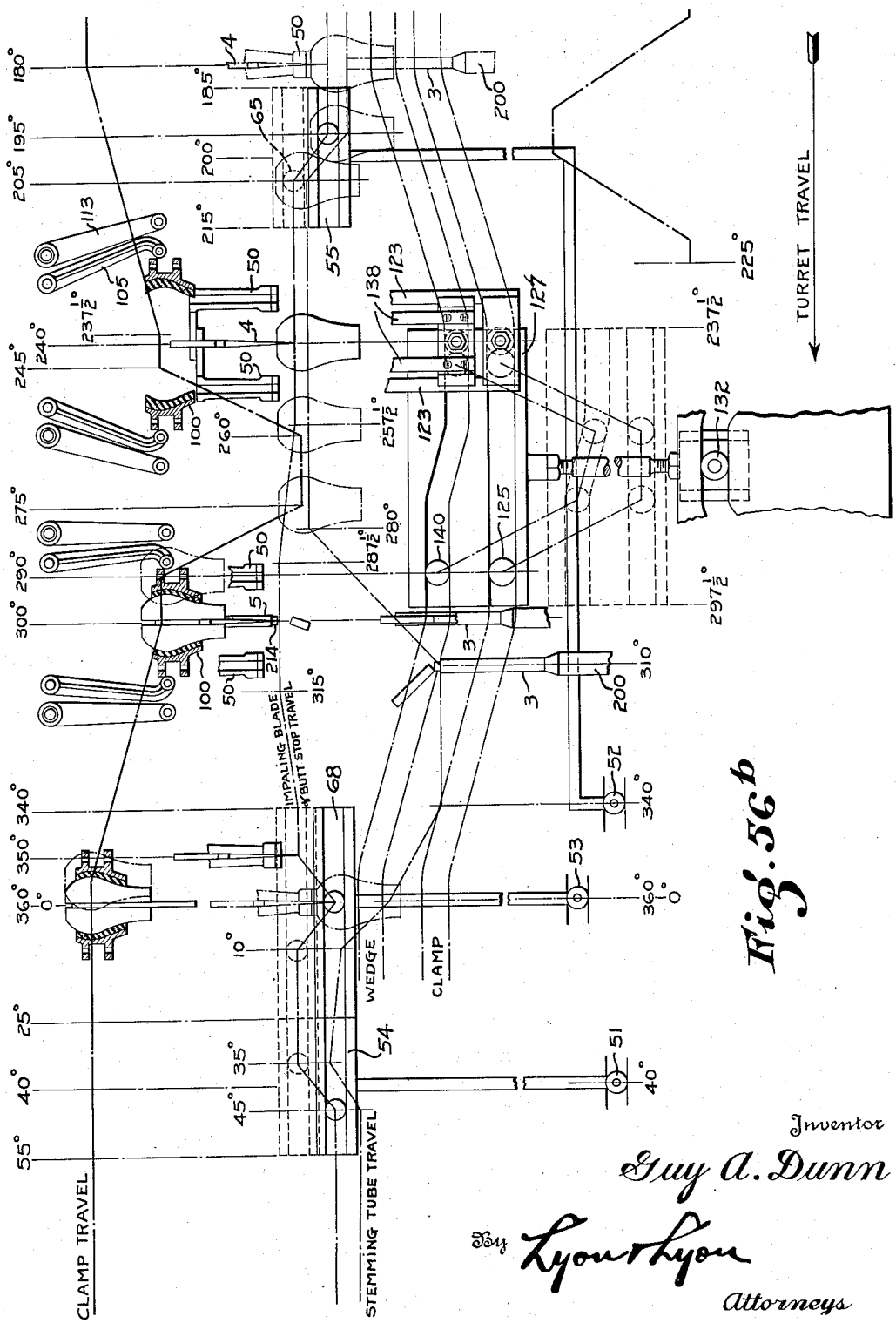

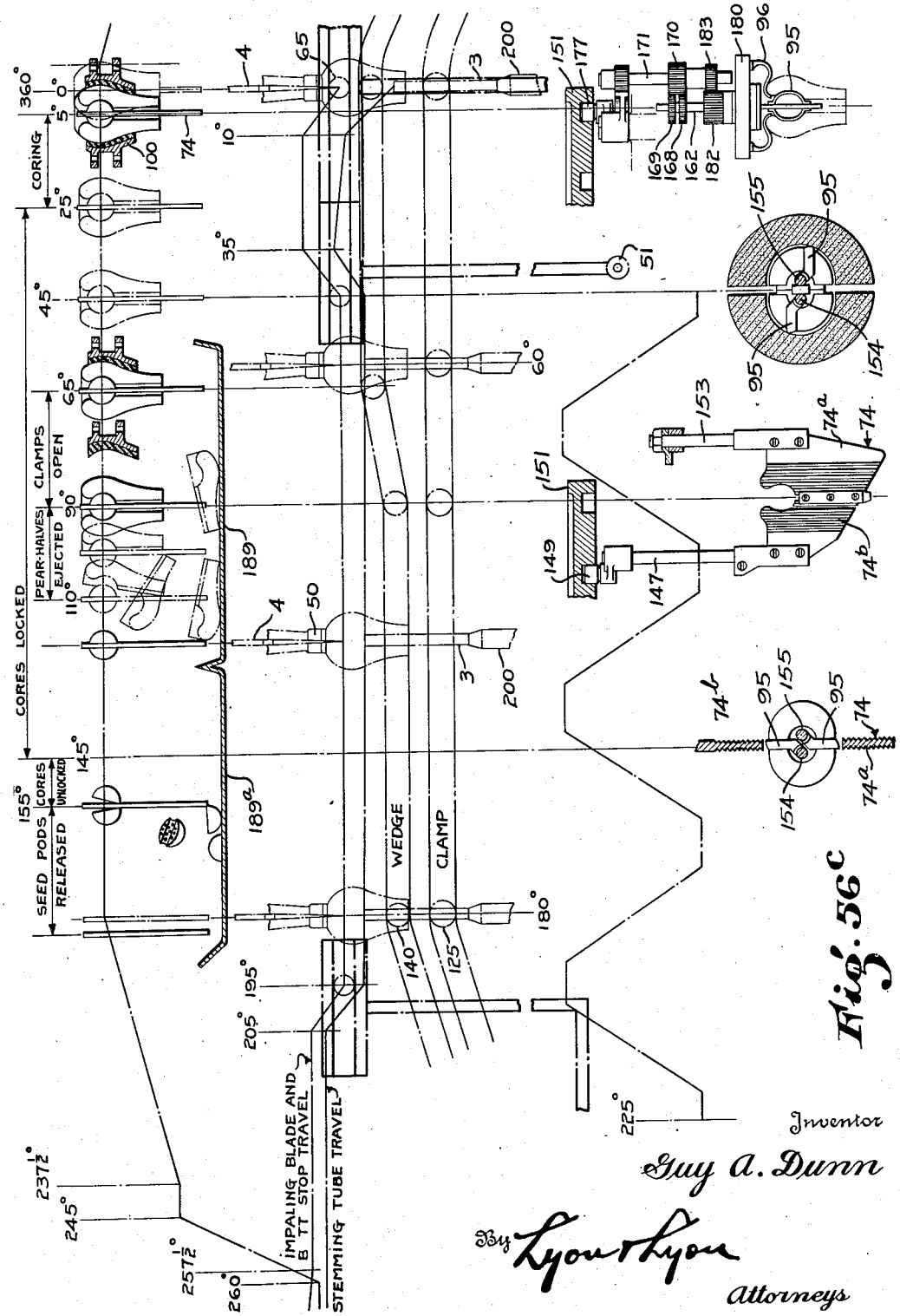

Patented Nov. 3, 1953

2,657,725

UNITED STATES PATENT OFFICE 2,657,725

FRUIT PROCESSING MACHINE

Guy A. Dunn, Oakland, Calif., assignor to California Packing Corporation, San Francisco, Calif., a corporation of New York Application April 25, 1949, Serial No. 89,471

23 Claims. (Cl. 146—33)

This invention relates to a machine for the processing of fruit, particularly fruit of irregular external contour such as pears preparatory to the canning or other use of such fruit.

This invention is more particularly directed to an improvement in a machine for processing fruit such as pears as is disclosed in Letters Patent granted to me January 18, 1949, No. 2,459,368, for Pear Peeling, Coring and Splitting Methods and Apparatus.

It is the principal object of this invention to produce a machine and apparatus for the processing of fruit such, for example, as pears, which is of the continuous operating type and which is constructed to provide for improved efficiency and operation of such machine and so as to reduce the size and enable the speed of operation of such machine to be increased over that as set forth in the aforesaid Letters Patent granted to me.

It is a further object of this invention to produce a continuously operating machine for the processing of fruit such as pears, which machine is capable of operation at relatively high speeds correlated with the ability of the feeding of pears to such machine, either manually or through automatic feeding devices.

It is a further object of this invention to produce a continuously operating machine of the character defined in which means are provided for effecting the relative movements of the parts and wherein there are employed what I define as compound cams operable to reduce the pressure angles imposed upon simple cams in order to effect the necessary travel and timing of operation of the relative parts of the machine.

Other objects and advantages of this invention it is believed will be apparent from the following detailed description of a preferred embodiment thereof as illustrated in the accompanying drawings.

In the drawings:

Figure 1 is a side elevation of a pear preparation machine embodying my invention illustrating in dotted lines a pear as it is fed into the machine and in a position where it is supported between the clamps and neck ring and likewise illustrating in dotted lines a portion of the splitting blade and coring unit in the position of discharge of the pear halves from the machine.

Figure 2 is a top plan view with some of the operating units removed.

Figure 3 is a side elevation mainly in mid-section of the main operating turret also illustrating the peeling and coring units in elevation and taken substantially on the line 3—3 of Figure 2.

Figure 4 is a side elevation on a larger scale of the lower portion of the operating turret illustrating the cam driving mechanism.

Figure 5 is a fragmental sectional elevation of the impaling blade and butt stop mechanism.

Figure 6 is a detached perspective view of the butt stop opening and closing mechanism.

Figure 7 is a detached perspective view of one of the two halves of the butt stop.

Figure 8 is a fragmental sectional plan view taken substantially on the line 8—8 of Figure 5.

Figure 9 is a fragmental elevation partly in mid-section taken substantially on the line 9—9 of Figure 8.

Figure 10 is a fragmental view partly in horizontal section of the impaling blade and butt stop mechanism, the butt stops being in open position and illustrating the supporting and driving mechanism therefor.

Figure 11 is a detached perspective view of the halving and transfer blade of Figure 9.

Figure 12 is a plan view in horizontal section taken substantially on line 12—12 of Figure 5.

Figure 13 is a fragmental sectional elevation taken substantially on the line 13—13 of Figure 12 and illustrating the coring and shaping unit and the operating mechanism therefor.

Figure 14 is a plan elevation taken on substantially the line 14—14 of Figure 13.

Figure 15 is a sectional plan view taken substantially on the line 15—15 of Figure 13.

Figure 16 is a sectional plan view taken substantially on the line 16—16 of Figure 13.

Figure 17 is a sectional elevation taken substantially on the line 17—17 of Figure 13.

Figure 18 is a detached perspective view of the supporting plate of the coring and shaping unit illustrating the center bar support thereof.

Figure 19 is a fragmental elevation partly in mid-section of the peeling head driving mechanism and taken substantially on the line 19—19 of Figure 20.

Figure 20 is a fragmental sectional plan view of the peeling head driving mechanisms, the section of one of said heads being taken through the cutting blade supporting arm and tension mechanism and the section of the other head being substantially mid-way of the ring gear illustrated in Figure 19.

Figure 21 is a plan view partially in vertical section of a peeling head and taken substantially on the line 21—21 of Figure 20.

Figure 22 is a fragmental sectional view taken substantially on the line 22—22 of Figure 20.

Figure 23 is a diagrammatic fragmental view of the peeling mechanism illustrating the same in the operation of removing a peeling from a fragment of a pear.

Figure 24 is a detached fragmental elevation taken substantially on the line 24—24 of Figure 3, partly in mid-section of the stemming tube and its operating mechanism.

Figure 25 is a sectional elevation of the stemming tube core ejecting mechanism taken substantially on the line 25—25 of Figure 24.

Figure 26 is a plan view taken substantially on the line 26—26 of Figure 25.

Figure 27 is a diagrammatic view partly in vertical section illustrating the operation of impaling a pear between the stemming tube and pear impaling and halving blade.

Figure 28 is a view similar to Figure 27, illustrating the halving blade raised to engage the center rod of the coring and shaping unit and ejecting the stem fibre core from the stemming tube section of the halving blade.

Figure 29 is a sectional elevation of the compound cam elevating mechanism for operating the halving and upper impaling mechanism and illustrating its relation to the butt stop operating mechanism.

Figure 30 is a plan view taken substantially on the line 30—30 of Figure 29.

Figure 31 is a sectional view taken substantially on the line 31—31 of Figure 29 and illustrating the stationary cam in dot and dash lines.

Figure 32 is a view taken substantially on the line 32—32 of Figure 29 and illustrating the cam slide mechanisms of the compounding cam movement rollers.

Figure 33 is a broken perspective view partly in section of the compound cam mechanism of Figure 29.

Figure 34 is a perspective view partly in horizontal section of the secondary compound cam provided for actuating the upper impaling halving blade.

Figure 35 is a sectional fragmental plan view taken on line 35—35 of Figure 5.

Figure 36 is a fragmental sectional elevation taken substantially on the line 36—36 of Figure 34.

Figure 37 is a fragmental perspective view partly broken-away of an elevation driving cam segment of the impaling and halving blade operating cam.

Figure 38 is a similar perspective view of the second driven cam segment operating mechanism of the impaling and halving blade operating cam.

Figure 39 is a similar perspective view of the third driven cam segment of the operating cam of the impaling and halving blade operating mechanism.

Figure 40 is a perspective view schematic in character of the clamp operating and transfer cam mechanisms.

Figure 41 is a plan view taken substantially on the line 41—41 of Figure 40.

Figure 42 is a fragmental sectional view taken substantially on line 42—42 of Figure 44, and Fig. 3.

Figure 43 is a perspective view of the main rotating column and guides for actuating rods for one transfer unit.

Figure 44 is a view taken substantially on the line 44—44 of Figure 42.

Figure 45 is a fragmental perspective view of the transfer clamp operating mechanism illustrating the guide rod supports and cam roller brackets thereof.

Figure 46 is a detached perspective view of the transfer clamp and wedge actuating crossheads and rods.

Figure 47 is a fragmental elevation of the transfer clamps for transferring fruit from the peeling to the halving and coring and shaping mechanisms.

Figure 48 is a front elevation of Figure 47.

Figure 49 is a detached view of one clamp illustrating the same with relation to a pear and illustrating one of the wedge actuating cams for the clamps.

Figure 50 is a detached plan view of the transfer clamps taken substantially on the line 50—50 of Figure 48.

Figure 51 is a sectional elevation taken substantially on the line 51—51 of Figure 50 illustrating opposing elements of the clamp gripping a pear.

Figure 52 is a schematic plan view illustrating the drive mechanism between the feed and operating units and the drive mechanism for the operating turret and the main primary cams.

Figure 53 is a time operational chart of a peeling head illustrating the cams in their respective time positions.

Figure 54 is a schematic view illustrating the peeling operation and the movements of the pear impaling blade with relation to the peeling knives.

Figure 55 is a schematic detached view of the cam for opening and closing a peeling knife.

Figures 56A, 56B and 56C are timed operation charts illustrating in Figure 56A the sequence of the operations performed upon a pear as it is transferred to the operating turret and into the peeling head. Figure 56B is a continuation of Figure 56A viewed from right to left illustrating the latter portion of the peeling cycle, the operation of the transfer clamps in transferring the pear from the peeling head across the halving blade to split the pear into its two halves after the removal of the butt stops from position and the discharge of the stem fibre cores from the stemming tube and the impaling blade of the halving unit. Figure 56C is a continuation of the timed operation chart of Figure 56B viewed from right to left illustrating the transfer of the pear to its position with relation of the coring and shaping unit and the discharge of the half pears and seed pods.

In the particular modification of the invention as shown on the accompanying drawings, I have illustrated the same as being particularly adapted for the processing of the pears preliminary to canning in which the pears are fed into the machine in a separately positioned feed turret or feed unit A and from which they are transferred to an operating unit B in which the pears are peeled, halved, shaped and in which the stem fibre as well as the seed pods are removed from the pears in order to produce finished pear halves suitable for canning and which are of high standard and quality.

The feed unit as illustrated may be of any suitable or desirable construction and into which the pears are fed, either manually or through suitable feeding means, and the feed unit A may be constructed as, for example, as illustrated in Letters Patent No. 2,429,346 granted to me October 21, 1947, for Feeding Means for Pear Peeling Machines, or as illustrated in Letters Patent No. 2,447,640, granted to me August 24, 1948, for Method and Apparatus for Orienting, Peeling, Halving, and Coring Pears, or in any other suitable manner which will properly orient the pears as they are delivered to or within the operating turret.

In this feed means as illustrated, the stem fibre containing axis of the pear is located in position so that it may be delivered in this position to the operating turret as, for example, in a vertical position at which point it is transferred to the operating means in the operating turret in the position in which it is oriented in the feed means.

As the feed means form no particular part of the present invention, its details of construction will not hereinafter be particularly referred to or set forth other than as necessary to show the relation of the parts of the feed mechanism to the operating turret B.

As thus viewed in Figure 1, the feed unit A delivers the pear to the operating turret B positioned within a centering ring 1 and held in such position by clamps 2 so that at the point of transfer of the pear from the feed unit A to the operating turret B the pear is aligned with and transferred to a stemming tube 3 and an upper impaling blade 4. The upper impaling blade 4 contains a tube section 5 for holding fins 6 extending radially therefrom. The stemming tube 5 of the impaling blade 4 forms in effect a continuation of the stemming tube 3 in the operation of supporting the pear on the stem fibre containing axis and in the operation of removing the stem fibre from the pear.

As the pear is thus positioned between the impaling blade 4 and the stemming tube 3 the pear is lifted out of the ring 1 as the clamps 2 are released and operation of the unit A swings or moves the ring 1 and the clamp 2 away from the pear, leaving the pear supported between and upon the stemming tube 3 and the stemming tube section 5 of the impaling blade 4 and in such position the pear is moved into position within the peeling unit C.

In the particular illustration given, the operating turret B contains six operating assemblies, each of which is composed of a peeling unit C of which the stemming tube 3 is a part, a halving and upper impaling unit D, of which the impaling blade 4 is a part, a transfer unit E, operating to transfer the pears from the unit C over the halving and upper impaling unit D to sever the pear into two halves and to complete the stem fibre removing operation, and a coring and shaping unit F to which the pear is delivered by the transfer unit E. The coring and shaping unit F operates to remove the seed pod from the pear halves and to complete the peeling and shaping of the pear at its upper calyx end.

Each of the operating units as thus described completes its cycle of operation in carrying out the aforestated functions during one revolution of the main turret of the operating unit B so that the mechanism provided for carrying out these individual functions progress through six complete operations in one rotation of the turret itself. In this manner for the operating turret to process a particular number of pears as delivered from the feed unit A, each of the six assemblies of the operating units in the operating turret is required to operate only one-sixth as fast as if one unit alone were to handle the number of pears delivered from the feed unit A. There is no particular significance in the use of six such assemblies of units as any other number of units might be employed, depending upon the particular requirements of operation.

In the preferred embodiment of this invention means are provided for driving the feed unit A and the operating turret B in timed relation which means may be of any suitable construction but are herein illustrated as a suitable motor 7 which drives the operating shaft of a gear reduction unit 8 through a belt transmission 9 and a gear reduction unit 8 in turn drives the gear 10 fixed to the rotating column 11 of the feed unit A. The gear 10 in turn meshes with the main drive gear 12 of the operating turret, thus definitely timing the relation of the feed unit A to the operating turret B.

The operating turret B includes a base 13 to which there is affixed a stationary column 14 upon which the gear 12 is journaled.

Means are provided for driving the main operating turret 15 from the gear 12, which means are herein illustrated as of the following construction:

Formed on the gear 12 is a lower turret ring (Fig. 3) to which suitable drive rods 17 are secured and these drive rods in turn pass through suitable bosses 18 formed in the upper turret ring 19 forming the operating turret 15. A cylindrical shield 20 is connected between the rings 19 and 16 to form a housing for the operating mechanism. Means are provided for driving the main rotating cam cluster 21 from the drive gear 12 so that the cam cluster rotates through six complete revolutions for each single rotation of the gear 12, which means are preferably of the following construction:

Supported by the stationary column 14 is a is a stationary spider 22. Formed on an inner ring 23 secured to the drive gear 12 is a gear ring 23a which meshes with a pinion 24 journaled on a shaft 25 secured to the stationary spider 22. Secured to the same shaft 25 is a second gear 26 which meshes with a gear 27 carried by a shaft 28 journaled in the stationary spider 22. The shaft 28 at its opposite end is secured to drive gear 29 which in turn meshes with the gear teeth 30 formed on the lower hub of a disc 31 which is journaled on a bearing 32 supported on the stationary column 14. The disc 31 forms the lower supporting plate for the cam cluster 21 which is composed of an outer cam ring 33 which is secured to the disc 31 and provides the peeling head oscillating cam track 34.

Positioned within the cam ring 33 and fastened thereto is an internal cam ring 35 which provides a transfer unit operating cam track 36. An impaling blade cam operating ring 37 is positioned upon the disc 31 and secured thereto within the cam ring 35 and provides the cam tracks 38 and 39. The cam track 38 provides the cam for the operation of the impaling blade 4 during transfer of the pear from the feed unit A to the operating unit B. The cam track 39 provides the cam for operation of the impaling blade 4 in lowering the pear into position with relation to the peeling unit C at the start of the peeling operation and also for raising the pear out of position with relation to the peeling unit C after peeling is completed.

Also provided at the base of the machine is a stationary cam ring 40 which provides the stemming tube cam track 41.

Means are provided for oscillating peeling unit C to carry out the peeling function through 180° of rotation of the main turret and so that the peeling heads when they are passing through the 180° of rotation of the main turret are held from reciprocation and in the starting position at which the pears are fed into the peeling unit C. In order to accomplish this result, the cam track 34 of the cam ring 33 is provided, which cam ring 33 is rotated six times for each single rotation of the main turret ring 15.

Positioned in the cam track 34 is a cam roller 42. The cam roller 42 is carried by a bracket 43 which is secured to the movable cam ring segment 44 which is thus reciprocated once for each rotation of the cam ring 33 or once through each 60° of travel of the turret 15. Carried in the cam track 45 of the segment 44 are cam rollers 46, one for each peeling unit C. The cam rollers 46 and their supporting shafts are secured to crosshead 47. The crosshead 47 is secured to the end of the actuating square rods 48 of the peeling unit C. A stationary cam ring 49 is formed integral with the cam ring 40 and extends for 180° of the path around the stationary column 14. As the peeling cycle of each head is completed in 180° around this path, each peeling head cam roller 46 will pass into the track of the stationary cam ring 49 through 180° of the travel of the turret 15. During the other 180° the cam rollers 46 are passing through the cam track 45 of the reciprocating cam ring segment 44 and thus operate to reciprocate the peeling unit C through three vertical strokes in carrying out the peeling operation in the 180° travel.

The means provided for operating the halving and upper impaling blade unit D include not only the means for reciprocating the blade 4 to impale the pear held in alignment by the feed turret centering ring 1 at the point of transfer from the feed unit A to the operating turret B, but also for lowering the impaling blade 4 to position the pear properly with relation to the cutting knives of the peeling unit C and thereafter raising the pear out of position with relation to the peeling knives of the peeling unit C to a point where the pear is picked up by transfer unit E but also the means for operating the butt stops 50 in correct timed sequence with the movement of the impaling blade 4. The means provided for accomplishing these results include the inner cam ring 37 which provides the two cam tracks 38 and 39 in which the cam rollers 51 and 52 are positioned in the cam track 39, and the cam roller 53 which is positioned in the upper cam track 38. These three cam rollers are provided to operate the movable cam segments 54, 55 and 56, respectively. These cam segments are respectively carried upon operating rods 57, 58 and 59.

The cam roller 51 has its supporting shaft secured to the bracket 60 which bracket 60 is in turn secured to the rod 57. Cam roller 52 has its supporting shaft secured to a corresponding bracket secured to rod 61. The rod 61 is operatively secured to the rod 58 so that these two rods move together. The cam roller 53 is secured by means of a bracket 62 to the operating rod 59. The cam segments 54, 55 and 56 are segments of the complete cam, the remainder of which is formed by the stationary segments 63 and 64 (Fig. 34).

This complete cam assembly provides the means for reciprocating the impaling blade 4 to its respective position in the sequence of operation. Assuming the cam roller 65, which is carried by the impaling blade crosshead 66, to be in the cam groove 67 of the segment 63 and just leaving this segment in traveling in a clockwise direction, the impaling blade is in its starting or raised position, the roller in passing from the groove 67 into the track 68 of the moving segment 56, this segment then moves downwardly to impale the blade 4 into the upper end of the pear. The segment 56 then moves upwardly so that the pear may be lifted out of the ring 1 of the transfer unit A. The movable segment 54 at this time is at its upper position so that the roller 65 passes into the track 69 thereof from the track 68 of the cam segment 56. The movable segment then moves downward to move the pear into the peeling unit C in proper position with relation to the peeling knives of this unit. The cam roller 65 then travels through the straight track 70 of the stationary segment 64 and remains in this track through the three vertical reciprocations of the peeling unit C and until the peeling of the pear is completed; the roller 65 then passes into the track 71 of the segment 55, which segment is then in its lower position. Segment 55 then moves upwardly to move the pear out of the peeling unit C with the roller then passing into the track 67. In this track 67 the impaling blade 4 is raised upwardly to where the blade at its inclined face 72 meets the correspondingly inclined face end 73 of the coring unit blade 74, at which time the pear is transferred from off the blade 4 onto the coring unit blade 74.

During these operations the butt stop 50 is operated to provide an upper stop to hold the pear from moving upwardly during the upward movement of the peeling knives 75 of the peeling unit C. The butt stop 50 is formed in two half segments 50a and 50b. These two segments are formed at the end of crank arms 76 and 77 which are secured to operating pins 78 and 79. Likewise secured to the pins 78 and 79 are pinions 80 and 81 which mesh with racks 82 and 83. The racks 82 and 83 are formed into horizontal spaced relation at the end of the slide block 84. The slide block 84 carries at its inner end a cam roller 85 which travels in the cam groove 86 of a reciprocating cam blade 87. The cam blade 87 is secured to a bracket 88 which bracket is in turn secured to a rod 89. The rod 89 is secured to the lower end of a crosshead 90 which carries a cam roller 91 traveling in the cam track 92 of the stationary cam ring 93. The cam groove 86 has a long vertical straight section permitting the impaling blade 4 to move up and down in its operation as heretofore described without causing the butt stops 50 to open. The butt stops 50 are provided at their lower end with a cushioning rubber 94 so that the pear is yieldably held downwardly in its proper position for peeling.

Means are provided for transferring the pear, after peeling has been completed, over the halving and impaling blade 4 to split the pear into two halves and to position the two halves upon the blade 74 of the coring and shaping unit with the seed pod properly positioned with relation to the coring knives 95 and the shaping knives 96, which means are herein illustrated as constituting the transfer unit E which has the following construction and operation:

The transfer unit E includes two opposed clamp members 97 which carry at their ends on pivots 99 clamp segments 100 shaped to the contour of a pear and provided with rubber or yieldable elements 101. The clamp members 100 have a slight oscillatory motion about the pivots 99 to accommodate themselves to the contour of the particular pear.

The clamp members 97 are pivoted upon pivots 102 for limited oscillatory motion determined by the clearance between the rear face of the clamp arms and the journals 103 which are positioned between the forked eyes 104 of the arms 105, which arms 105 are pivoted at their opposed ends on pins 106 passed through the bearing block 107 secured at the end of the supporting bracket 108. The journals 103 are formed at the ends of a link 109 and are held in position by means of a pivot pin 110 which passes through the journals 103 and eyes 104. The link 109 is journaled at its opposed end which is pivoted on a pivot pin 111 within the forked end 112 of a parallel link 113. The link 113 is journaled on the shaft 114 which passes through the bearing block 107. The shaft 114 is secured against rotation within the bearing block 107 and carries a tension spring 115, one end of which is stopped against a stop 116 formed on the parallel link 113.

A tension crank 117 is secured to the end of a shaft 114 and carries a pin 118 engaging the opposed free end 119 of the coil spring 115. The spring 115 may thus have its tension adjusted by rotating a shaft 114 within the bearing block and the spring provides a tension at which the clamp segments 100 are urged against the fruit.

The parallel motion of the two links 105 and 113 assures that the clamp segments travel in a substantially straight horizontal line in clamping the pear in position. Means are provided for operating the clamps to clamp and release the pear at the desired points of transfer, which means preferably are of the following construction:

The supporting brackets 108 are secured by cap screws 120 to securing blocks 121 which are in turn secured by cap screws 122 to the ends of the operating rods 123. The rods 123 are at their lower ends secured to a crosshead 124. The crosshead 124 carries a cam roller 125 which travels in the cam groove 126 of the stationary cam ring 127 and also in the cam groove track 128 of the reciprocating cam segment 129, depending upon the position of the clamps around the turret. The reciprocating segment 129 is secured to an operating rod 130 which in turn is secured to the crosshead 131 which carries the cam roller 132 which travels in the cam track 133 of the cam ring 35. This reciprocation of the rods 123 and the clamp provides for the up-and-down movement of the clamp in moving the same from the position where they clamp a pear on the impaling blade 4 and transfer the pear to the coring position upon the blade 74 of the coring and shaping unit F.

The means for opening and closing the clamps includes a wedge cam roller 134 carried by parallel links 113 in position to engage the cam wedge 135 carried at the end of arms 136. The arms 136 are secured to slide blocks 137, which slide blocks 137 are secured at the upper ends of the wedge cam operating rods 138. These rods 138 are secured at their lower end to a crosshead 139 which crosshead carries a wedge cam actuating roller 140 which travels in the cam track 141 of the stationary cam ring 127 and in the upper cam groove of the reciprocating cam segment 129. The pear is thus transferred to the blade 74 of the coring and shaping unit F with the stem fibre channel formed therein in registry with the tube section 142, having an external diameter the same as that of the stemming tube 3 and its upward position having been determined from the position of the butt stop 50 in its first positioning operation; the seed pod being in register with the coring knives 95 and the upper surface of the pear being in register with the shaping knives 96.

Means are provided for operating the unit F, which means are preferably of the following construction:

A gear housing 143 is supported from the stationary column 14 by a block 144 which in turn is secured to a spider 145 directly secured to the column 14. The coring unit blade 74 is formed of two blade sections 74a which is a stationary section and 74b which is pivotally supported through the medium of a blade bracket 146 which is in turn secured to a shaft 147 journaled in the housing 143 and carrying at its upper end a cam roller crank 148. The crank 148 carries at its opposed end a cam roller 149 which rides in a cam track 150 formed on the under surface of the top plate 151 of the machine. The top plate 151 is in turn secured to the stationary column 14.

The operation of the cam roller 149 is to oscillate the shaft 147 to rock the movable blade sections 74b after the coring operation has been completed to dislodge the pear halves from the blade 74. This release of the pear half occurs after the clamps of the transfer unit E have released the pear. The stationary section 74a of the blade 74 is secured to the gear housing 143 by means of a bracket 152 secured to the end of a pin 153 to the gear housing 143.

The coring knives 95 are secured at the ends of operating shafts 154 and 155, which shafts have at their opposite ends pilot shafts 156 which are journaled in bores formed in the upper ends of the portion forming the pilot section 142. The two shafts 154 and 155 are journaled in a journal formed of a central bearing bar 157 which is secured between the two halves of the pilot section 142 by means of a cap screw 158 which passes through the cap screw bore 159 of the rectangular extension of the central bearing bar 157 and is threaded into the opposite half of the pilot 142.

Two bearing caps 160 which set within the curvature of the knives 95 are secured together over the shafts 154 and 155 and central bearing bar 157 by means of screws 161, keeping the journal for the shafts within the curvature of the coring blades 95. The curvature of the exterior of the bearing caps 160 forms an extension of the pilot 142 and are of the same external radius as the stemming tube 3.

The shafts 154 and 155 are detachably connected to operating gear shafts 162 and 163 by means of bayonet connections. The bayonet connections are formed by providing sockets 164 at the connecting end of the shafts 154 and 155 which has a polygonal socket into which a corresponding multiple side key 165 is fitted. Each shaft 162, 163 is provided with a plug 166 having a corresponding polygonal socket into which the key 165 extends to complete the connection. The shafts 162, 163 are journaled in the cap 167 of the gear housing 143 and the operating gears 168 and 169 therefore mesh with the gear teeth 170 of an elongated gear 170a secured to the operating shaft 171. The shaft 171 is journaled at one end in the housing 143 and in the cap 167 and carries at its outer end a gear pinion 172 which meshes with the gear teeth of a gear segment 173 formed at the end of a crank arm 174, which arm is journaled upon a pin 175 secured to the cap 167. Formed integral with the crank arm 174 is a crank arm 176 carrying at its outer end a cam roller 177 positioned with the cam track 178 formed in the top plate 151.

The shaping knives 96 and their shanks 179 are secured to a spider 180 which is secured to a gear sleeve 181. The sleeve 181 is journaled in the gear housing 143 and its gear teeth 182 mesh with the gear teeth 183 formed on the elongated gear 170a. The sleeve 181 is journaled on a hollow stud 184 which is threaded into a housing boss 185 formed in the housing 143 and has a bearing flange 186 formed at its outer end to which a closure plate 187 is secured.

The plate 187 is formed in two halves so that it may be removed when it is desired to remove the knives 95. To remove the knives 95, the bearing caps 160 are removed as are the halves of the pilot 142, permitting the knives 95 and their shafts to be lifted from position for replacement or repair as it may be required.

In order to hold the shafts 162 and 163 in position when the coring knives 95 and their operating shafts are removed at the bayonet connection, the shafts 162 and 163 are provided with lateral supporting blocks 188, one of which rests upon the end of the housing boss 185 and the other of which acts to space the operating gears 168 and 169.

In coring and shaping the pear, the coring knives 95 each rotate through 180° in cutting the half seed pod from each half pear section. The coring knives are then returned to a position to lock the seed pod sections in position between the knife and the bearing caps 160, that is so that they encompass the halves of the seed pod so cut from the pear halves. After the clamps of the transfer unit E have released the pear halves, the cam roller 149, operating in the cam track 150, causes the movable blade 74b to oscillate to dislodge the pear halves from the blade 74b so that they may fall by gravity onto the pear discharge chute 189.

The coring knives 95 are then returned to their position within the blade 74 and the seed pod halves are discharged at a position of further rotation of the coring and shaping assembly F around the turret so that the seed pod halves are discharged into a chute separate from or divided from the pear discharge chute 189.

Means are provided for operating the stemming tube 3 to impale the pear at the transfer point from the feed unit A to the operating turret B and for continuously progressing the stemming tube 3 along the stem fibre axis of the pear during the peeling operation to maintain a pressure against the butt stop 50 to hold the pear up in registered position during the peeling operation. This means as herein illustrated is preferably of the following construction:

The stemming tube 3 is threaded to a tube 190 (Fig. 24) and the tube 190 is at its lower end threaded to the stud 191 formed as an extension of the clevis 192. The clevis 192 is pivoted to the pin 193 and to the link 194. The link 194 is pivoted to the end of the cam arm 195. The cam arm 195 carries the cam roller 196 and this arm 195 is pivoted at 197 to a bracket 198 which is clamped upon the drive rod 17 of the main turret.

An ejector rod 199 is positioned within the stemming tube 3 and extends downward into the tube 190. Bearing means are provided for supporting the tube 190 which includes a bearing sleeve 200 which extends through a boss 201 formed in the main turret plate 15. At the opposite end the bearing sleeve 200 is threaded into a bearing cap 202, which bearing cap is in turn secured to the lateral flange 203 of a supporting bracket 204. The bracket 204 is secured to the under face of the main operating turret 15. To provide a bearing for the upper end of the bearing sleeve 200, a bearing cap 205 is threaded into the end of the bearing sleeve 200.

Means are provided in this assembly for supporting the stem fibre ejecting core rod 199 adjustably in position, which means are herein illustrated as including a plug 206 slidably mounted within the tube 190 and secured to an adjustment pin 207 projecting through an elongated slot 208 formed in the tube 190 and likewise through a slot 209 formed in the bearing sleeve 200 and threaded to a cross arm 210.

Cross arm 210 at its opposed ends is provided with an adjustment screw boss to receive the adjustment screws 211, which are in turn threaded to the lateral flange 212 of bracket 204.

Adjustment nuts 213 are threaded to adjustment screws 211 on the opposite sides of the bosses of the cross arm 210 so as to adjust the position of the plug 206 within the tube 190 and therefore determine the position of the upper end of the ejector rod 199 with relation to the stemming tube 3. Thus, when the stemming tube 3 is reciprocated by means of the operation of the cam roller 196 within the cam track 41 so as to move the stemming tube downward over the ejector rod 199, the stem fibre material cut from the pear and lying within the stemming tube 3 is ejected from the tube by the rod 199. The adjustment of this position of the upper end of the ejector rod 199 is such that the same barely extends beyond the end of the stemming tube 3 when the stemming tube is moved to its lower position.

Means are also provided for ejecting the portion of the stem fibre core from the end of the tube section 5 of the upper impaling blade 4, which means include an ejector rod 214 which is slidably mounted in the tube section 5 so as to be projected from the upper inclined surface 72 of the impaling blade 4. Thus when the impaling blade 4 moves upwardly (Fig. 28) to where the head 215 of the rod 214 engages the lower extension of the pilot 142 of the coring and shaping assembly F, ejector rod 214 is moved downwardly through the tube section 5 of the impaling blade 4, causing the stem fibre material to be ejected from the tube section 5.

The peeling unit C may be of any suitable or desirable construction and is herein illustrated as of the type illustrated in Letters Patent No. 2,447,640, granted to me August 24, 1948, in which four peeling knives 75 are provided and are moved through a spiral path to slice or shear the peeling from the pear and to remove the peeling from the pear in three strokes for each of the four peeling knives 75, thus removing the peeling from the pear in twelve spiral slices.

In the prior machines of my invention, the peeling assemblies were reciprocated or passed through their operations through the full 360° of rotation of the operating turret, even though they performed no useful function for approximately 180° of such rotation. In this machine the peeling heads become inoperative, are not operated during 180° of rotation of the main turret, but remain in the position of reciprocation at which the pears are removed from the influence of the peeling knives.

Each of the peeling heads, of which there are six in this machine, or any other suitable number depending upon the capacity of the feed of the pears to the machine, includes a supporting bracket 216, which is secured to the upper end of the operating square rod 48 which is reciprocated through the medium of the cam roller 46 operating within the cam track 45 of the movable cam segment 44, and likewise in the cam track of the stationary segment 49 of the same cam.

Secured to the bracket 216 is a peeling head base 217 upon which there is journaled a ring gear 218 supported with reference to the base 217 by means of a thrust ring 219. The gear ring 218 has external gear teeth 220 which mesh with the gear teeth of elongated pinions 221 which are secured to pinion shafts 222 journaled at their opposed ends in bearings 223, 224. The shafts 222 extend through the bearings 224 and drive pinions 225 are secured thereto.

The pinions 225 mesh with a stationary ring gear 226 which is secured to the stationary column 14 through the medium of an adapter ring assembly 227. Thus if the turret is rotated around the stationary column 14, the pinions 221 are rotated and the gear ratio provided between the stationary gear 226 to the ring gear 218 of each peeling head is such as to effectively hold the gear 218 and peeling heads from rotation as the peeling heads travel around the main turret.

As the pear being peeled is supported by the stemming tube 3 and travels around the main turret, it will in effect pass through a relative rotation of 180° with respect to the peeling heads as they pass through their operating cycle of 180°, as the heads are held from rotation around their own axis. During this interval the pear in effect has a relative rotation of 180° with respect to each peeling knife of the peeling assembly.

Means are provided for operating peeling knives 75 to peel the pear during the aforementioned relative rotation, which means are preferably of the following construction:

Each peeling knife 75 is supported at the end of an operating rod 228. The precise construction of the knife assembly, including its depth roller 229 and its pivotal support, forms no part of the present invention, and its construction may be as illustrated in the Patent No. 2,447,640 hereinabove referred to, or of any other suitable construction.

The rods 228 are offset and their lower ends are secured within a head 230 of the oscillatory shaft 231. The shaft 231 is journaled in a bearing bushing 232 within a horizontal boss 233 of the ring gear 218. The opposite end of the oscillatory shaft 231 is journaled in a spring bushing 234. A torsion spring 235 surrounds the oscillatory shaft 231 and has one end secured to the bushing 234 as indicated at 236 and has its opposite end secured to the hub 241 of the cam roller crank arm 242.

Carried by the crank arm 242 is a cam head 243 which engages the cam roller 244. The inner end of the bushing 234 is provided with wrench notches 237 so that the bushing 234 may be turned to determine the torsion within the spring 235 and the bushing 234 is locked in its adjusted position by means of a lock screw 238 adapted to fit within any one of a number of lock recesses 240 formed in the bushing 234.

The cam roller 244 (Fig. 20) is carried by the cam operating ring 245 which is journaled on the vertical flange of the base 217. The operating ring 245 also carries a segment of gear teeth 246 which mesh with the gear teeth of a gear quadrant 247, the hub of which is journaled upon a pin 248 carried in the gear ring 218.

Carried by the quadrant 247 is a cam roller 249 which engages the cam surface 250 of a cam ring 251 which is secured to the base 217. As the cam roller 249 passes over the raised portions 252 of the cam surface 250, the operating rods 228 are swung from the full line to the dotted line position as illustrated in Fig. 21. Carried upon the upper opening of the gear ring 218 is a peeling hopper 253 into which the peelings severed from the pear drop and fall through the gear ring 218 onto an inclined chute 254. In order to prevent the peelings from accumulating within the gear ring as they tend to accumulate in the opening of the gear ring 218, a plurality of agitating pins 255 are provided to dislodge any peelings which tend to accumulate within the peeling head and cause the same to be discharged down the chute 254.

The operation of the pear preparation machine embodying my invention and its sequential operation is best understood by reference to Figures 56A, 56B and 56C.

Referring to Figure 56A, the right-hand edge of this drawing shows the pear 300 as held between the stemming tube 3 and upper impaling blade 4, and with its large end stopped against the butt stops 50. This is the position in which the pear is first gripped in transferring from the feed unit A to the operating unit B in clearing the feed unit centering ring 1. The pear is lifted from the centering ring 1 as the cam rollers 196 and 65 move together over corresponding inclinations of their cam tracks to raise the stemming tube impaling blade and pear upward during the first 10° of travel. During this travel it will be noted that the effective inclinations of the cam track in which the roller 196 is traveling is greater than that of the track through which the roller 65 is traveling, so that there is progressive impaling of the pear by the stemming tube 3 throughout the period of peeling of the pear. This will be seen from the comparative elevations of the two lines diametrically indicating the effective cam tracks of the impaling blade and butt stop cam roller 65 and the stemming tube cam roller 196 from the right to the left in Fig. 56A. This progressive movement of the stemming tube maintains the pear against the butt stops 50, even in soft fruit, overcoming any tendency of the fruit to slide down the stemming tube 3 out of correct position with relation to the peeling knives 75.

After the pear has been released from the clamps and ring 1 of the fed unit A during the first 35° of travel of the turret, the pear is lowered into the proper position with relation to the peeling knives 75. This lowering operation occurs during the next 10° of travel of the turret. During the next 180° of operation of the turret, the roller 196 operates to reciprocate the peeling unit C through three strokes of reciprocation as the pear has an effective rotation of 180° compared to the relative stationary position of the peeling head.

Through each of the up strokes of the peeling head, the peeling knives are released so that the torsion springs 235 urge the same inwardly against the pear as the cam roller 249 therefor is between the high points 252 of the cam 250. At the upper end of the stroke the cam roller 249 will pass under the raised portion 252 of the cam 250, moving the knives away from the pear, allowing the head to follow through the next effective portion of the travel of the turret. This operation is repeated during each succeeding 60° of travel of the turret to where the peeling heads are down in their starting position at the end of the cycle of this operation with the peeling head cam roller 46 traveling in the horizontal stationary portion of the segment 49 of the cam track.

In order to effect the raising and lowering of the peeling heads through the distance required to effect the peeling in a smooth operation, the movable cam ring segment 44 is utilized, relieving the pressure angle of the cam track itself as the cam roller 42, traveling in its cam track, acts to raise and lower the cam ring segment 44. As the cam ring 33 is rotated through a complete cycle of 360° for each reciprocation of the cam track, the angle of inclination of this cam during its rise and fall can be spread out through 360° while the rise and fall of the cam ring 44 is taking place effectively in 60° of travel around the main turret.

Illustrated in the upper ring in Figure 56A is the corresponding travel of the transfer unit E designated as "clamp travel," in which it will be noted that for the first 180° rotation around the main turret, the clamps are maintained in an elevated horizontal position; that near the end of the upper stroke of the peeling knives during the last reciprocation of the peeling unit C, the clamps are started downwardly by the operation of the cam roller 125 in its corresponding cam track, and the wedge cam roller 140 synchronizes therewith.

Figures 56A, 56B and 56C are timed operation charts illustrating the sequence of action as the operating turret turns from 0° to 360°.

The angular movement of the turret is indicated by the numerals appearing along the upper edge of each of these charts. In order to afford a clearer understanding of the action where one chart ends and the next chart starts, the charts overlap as for example, in Figure 56A, the chart ends at the 237½° line while chart 56B starts at the 180° line, which latter point corresponds with 180° line on 56A, as will be observed by comparing the relative positions of the parts at these points.

The chart illustrated in Figure 56C is similar to the chart illustrated in Figure 56A in that it covers the same range of turret rotation, namely 360°, or the starting point of 0° to 260° of rotation, whereas 56A covers from the starting point of 0° to 237½°. The chart 56C adds to the disclosure of Figure 56A the coring and ejecting phases of operation, which operations take place simultaneously with the impaling and peeling operations.

In considering operation of the machine as illustrated in Figures 56A, 56B and 56C, it is suggested that Figure 56B should be taken first and to therein note the position of impaling blade 4 and its butt stop 50 at the 350° line as it appears at the left-hand end of this chart. This 350° line might be considered the starting point in the operation of the machine as herein the impaling blade 4 with its butt stop 50 is shown just before it is moved downwardly to impale pear 300 until the butt stop 50 engages the top surface of the pear to thereby correctly gauge the location of the pear on impaling blade 4. This action takes place between the 350° and 360°-0° lines. The up-and-down movement or action of the impaling blade with its butt stop is indicated in the charts by the angular line bearing the title "Impaling blade and butt stop travel." The mechanism which causes the impaling blade to follow the path as indicated by this line will be later described.

During the downward movement of impaling blade 4 from the 350° line to the 360° line, stemming tube 3 moves upwardly to impale the stem end of pear 300. This position of the parts is clearly shown in Figure 1.

The up-and-down movement of stemming tube 3 is illustrated in each of the charts by the angular line titled "Stemming tube travel." The means for operating the stemming tube has previously been described.

Pear 300 is presented to impaling blade 4 and stemming tube 3 at the 350° line by the feed unit A in such manner that the stem fibers of the pear are retained in axial alignment with the stemming tube and impaling blade by the feed unit centering ring 1 and clamps 2, and the fruit is retained so aligned until impaling blade 4 and stemming tube 3 have securely impaled the pear therebetween (Fig. 1).

During the impaling of the pear on impaling blade 4 and stemming tube 3, the feed unit clamps 2 are actuated to release the pear thereby freeing the pear to be lifted clear of centering ring 1. As will be noted in Figure 1, feed unit centering ring 1 is provided with a break or opening through which the stemming tube may pass. This lifting action is illustrated in chart 56A between the 0° and 10° lines.

The lifting action above referred to, namely, between the 0° and 10° lines, lifts the pear 300 clear of the centering ring and due to the uniform rotation of the feed and operating turrets, the stemming tube is carried clear of the feed unit centering ring. The swing of the stemming tube 3 from the centering ring 1 of the feed unit takes place between the 10° and 35° lines and between the 35° and 40° lines the impaling blade 4 and stemming tube 3 are moved downwardly as indicated by their respective lines to position pear 300 in correct peeling register with its associated peeling unit C.

For the next 180° pear 300 is maintained in peeling register while the peeling unit C makes 3 peeling strokes to fully peel the pear. The 3 peeling strokes are indicated by the broken angular lines extending from the 45° line to the 225° line, that is, for a full 180° of turret travel.

The peeling stroke line is clearly illustrated in Figure 56A just below peeling unit "C."

For the next 180° travel of the operating turret peeling unit C is retained in its lowermost position. This is an important feature of my machine and is made possible through the use of the compound cam means.

As previously described, peeling unit C is geared to the turret standard in such manner as to be held against what would be its normal turning action as the operating turret rotates. This action can be best illustrated by considering two spaced points along the center line of unit C which center line points to the north. As operating turret B turns through a full circle of rotation, the center line passing through the two spaced points will continuously point north, instead of swinging through 360° as would be its normal action if not so geared. On the other hand impaling blade 4 not being so geared will swing through a full circle during a complete rotation of operating turret 3. This particular relation between peeling unit C and its associated impaling blade 4 provides the spiral slicing action of peeling knives 75.

Below each of the humps of the peeling stroke travel line, there is diagrammatically illustrated a top plan view of peeling unit C illustrating the relative rotation between peeling unit C and its associated impaling blade 4.

Here I have also illustrated continuously advancing the stemming tube 3 into the stem end of pear 300 from the time the stemming tube enters the pear until all three of the peeling strokes have been completed. This continuous pause from the 237½° to the 245° line moves downwardly for the next transfer operation.

One of the most difficult and basic problems encountered in the designing of the machine was to find some way of obtaining the necessary travel for the several operating units during relatively short circular travel of the operating turret. This problem was made more difficult due to the high speed at which the machine must operate and to the necessity for confining such operating mechanisms within the relatively small space available.

Ordinary cams could not be used for several reasons, first, the maximum operating cycle was limited to 60° of circular travel of the main operating turret and in some cases the travel of the operating unit had to be completed within 10° of turret travel, and therefore to obtain the necessary travel for the operating units it would require a cam track slope well beyond practical operating limits; secondly, to provide an ordinary cam with a cam track slope which would give the required travel and still be within practical operating limits for a given rotation of the operating turret would have to be of such large diameter as to make its use prohibitive. It therefore was necessary to develop a new form of cam system which cam system I have referred to herein as a compound cam. Three of these compound cam systems are incorporated in the machine. All have the same basic principle of operation but vary in mechanical detail. These compound cam systems make possible the necessary long travels of the operating units for relatively short circular advances of the main turret with cam track pressure angles well within good engineering practice and enables smooth operating characteristics for the operating units when the machine is driven at relatively high speeds.

The simplest of the three compound cam systems is the one employed for reciprocating the peeling unit C which compound cam system is required to complete three reciprocations within 180° of the operating turret travel. The three peeling strokes through which peeling unit C is driven during the 180° of rotation of the main turret is illustrated in Figure 56A by the peeling stroke line and these strokes even though appearing abrupt in the diagram are made possible by the use of my compound cam system and the operation is extremely smooth and quiet.

The compound cam system for operating peeling units C includes cam ring 33 which has heretofore been described as making one complete revolution for each 60° of turret travel. This cam ring is provided with cam track 34 which cam track rises gradually from its lowermost point as shown at the right hand side of Figure 3 to the highermost point as shown on the left hand side of the same figure and likewise returns from its highest point to its lowest point so that for each rotation of cam ring 33 the cam track makes one rise and one fall.

Cam ring 33 may be considered as the primary cam in the compound cam system for peeling unit C and because the primary cam makes one full revolution for each 60° advance of the main turret, the cam track can have a relatively long and gradual cam slope thus making possible the long stroke necessary for the operation of peeling unit C.

A secondary cam unit is provided which is formed in two half segments each extending for 180°. The first of the secondary cam segments is stationary and is formed integral with the fixed cam ring 49 and the second cam segment 44 is movably mounted in the machine. The movable cam segment 44 is operatively connected by bracket 43 to the cam roller 42, which cam roller travels in the cam track 34 of the primary cam and by this arrangement the movable cam segment 44 is reciprocated up and down once for each 60° travel of the main turret.

It will be understood that the operation of the machine is continuous so that the movable cam segment 44 of the secondary cam is continuously reciprocated up and down for each 60° travel of the main turret. When the movable cam segment has reached its lowermost position the cam track in the primary cam provides a sufficient dwell for one of the peeling unit cam rollers 46 to pass from cam track 45 of the movable segment 44 into cam track 45 of the stationary cam segment and likewise the foremost of the peeling unit cam rollers 46 traveling in the cam track 45 of the fixed cam segment will pass into the cam track 45 of the movable cam segment.

In other words, with each cycle of operation one peeling unit cam roller enters the movable segment from the stationary segment and simultaneously therewith one of the cam rollers 46 travels from cam track 45 of the movable segment to cam track 45 of the stationary segment.

It will be understood that at all times excepting at the time of transfer there are three peeling unit cam rollers 46 traveling in cam track 45 formed in movable cam segment 44 and three traveling in cam track 45 formed in the stationary cam segment 49.

Each of the peeling head cam rollers 46 is connected to its respective peeling head in the manner previously described.

The compound cam system for the peeling head has a further advantage in that it only reciprocates the peeling heads during the peeling operation and it thereafter retains the peeling heads in their lowermost inoperative position. In other words, the peeling heads are reciprocated through three complete peeling strokes during 180° of turret travel and during the remaining 180° of turret travel the peeling heads are maintained inactive.

The second compound cam system operates transfer units E and their clamp segments 100. This second cam system includes a cam track 133 formed in cam ring 35 which cam ring in turn is formed as an integral part of the outer cam ring 33 and as previously pointed out the cam ring 33 also carries the cam track 34 which forms the primary cam for reciprocating the peeling unit C. It will therefore be seen that cam tracks 34 and 133 are in reality formed in one unitary cam structure and as a result thereof these primary cams are rotated one full revolution for each 60° of turret travel.

A cam roller 132 is arranged to travel in the primary cam track 133 and is operatively connected to cross head 131 which crosshead in turn is connected to movable cam segment 129 of the secondary cam for operating the transfer unit.

The secondary cam for the transfer unit includes movable segment 129 just referred to and also the stationary cam ring 127.

It will be noted that the movable cam segment 129 and the stationary cam segment 127 are each provided with cam tracks 126 and 141. The cam track 126 is for the operation of the transfer crowding action of the stemming tube is diagrammatically illustrated in Figure 56A and represents the vertical distance between impaling blade and butt stop travel line and stemming tube travel line. In illustrating this crowding action, attention is directed to the 0° line and to note at this location the vertical distance between the upper end of the stemming tube and the lowermost point of the impaling blade. By comparing the distance between the impaling blade travel line and stemming tube travel line from the 0° line to the 205° line it may be noted the manner in which the stemming tube travel line gradually and continuously approaches the impaling blade line throughout the full extent of this travel.

This crowding action continues until the pear reaches the 205° line and insures presenting the pear in proper register to be picked up by clamp segments 100 of transfer unit E.

Pear 300 now having passed through the peeling operation is fully peeled and its stem fibers are confined within the stemming tube. Pear 300 has now reached the 195° line on Figures 56A and 56B. Between the 195° and 200° lines pear 300 is lifted from peeling to transfer register.

During the initial impaling operation and until operating turret B has swung through 180° the transfer mechanism E has been maintained in its elevated position, as indicated in Figure 56A by the line entitled "Clamp travels."

It will be noted that the clamp travel line inclines downwardly from the 180° line to the 237½° line during which time its clamp segments 100 are retained in their open position, as shown in the first of the three transfer unit figures appearing in the upper right hand corner of Figure 56B. Also during this period of travel of the main operating turret B, the two halves of butt stop 50 are swung to their open position as illustrated in the same figure above referred to. The pear 300 is now ready to be received by the transfer unit and from the 245° line the clamp travel line is inclined sharply downwardly to the 260° line in order to bring clamp segments 100 into clamping register with the pear.

Between the 260° and 275° lines the elevation of the clamping unit remains stationary while the clamp segments 100 are released into clamping relation with the pear and from the 275° line the clamp travel line rises abruptly to the 290° line illustrating the lifting of the pear from stemming tube 3 and across the impaling and halving blade 4 and partially onto the coring unit blade 74.

Attention is directed to the abrupt downward slope of cam travel line between 245° and 260° lines and the abrupt rise of the clamp travel line between 275° and 290° lines. This abrupt inclination and relatively long travel of the transfer unit is made possible by another compound cam system.

While this action is taking place it will be noted that the impaling blade and butt stop travel line indicates a gradual rise of impaling blade 4 from the 257½° line to the 287½° line. This last upward movement of the impaling blade brings its upper edge 72 into register with the lower edge 73 of coring unit blade 74 so that the pear can be transferred from the impaling blade to the coring blade and during this transfer the pear is severed into two halves and also the lower end of pilot section 142 engages head 215 of rod 214 to eject such stem fiber material as may be confined within tube section 5 of impaling blade 4.

The discharge of the stem fiber from the tube section is clearly illustrated in the diagrammatic view appearing at the 300° line.

Simultaneously with the above actions stemming tube 3 is moved downwardly as indicated by the sharp downward inclination of the stemming tube travel line between the 280° and the 310° lines. This downward travel of the stemming tube permits ejector 199 to eject the stem fibers from the stemming tube as is diagrammatically illustrated at the 300° and 310° lines.

From the 300° line the transfer unit E gradually lifts the pear into coring register with the coring and shaping assembly F as is indicated by the upward inclination of the clamp travel line between the 300° and 355° lines.

While the pear is being transferred into coring register, the impaling blade is lowered into impaling position. This action takes place between the 315° and 340° lines as illustrated by the downward slope of the impaling blade butt stop travel line.

From the 340° line stemming tube 3 starts to rise rapidly as indicated by the upward slope of the stemming tube travel line and at the 350° line the impaling blade moves downwardly to cooperate with the upward moving stemming tube to impale the next pear to be processed.

The coring and shaping assembly F with pear 300 positioned in coring register therein, is shown in the lower right-hand corner of Figure 56C at the bottom of the 5° line.

From the 5° line to the 25° line the coring knives 95 and the shaping knives 96 are rotated through 180° to sever the seed pod from the pear halves and to shape the butt end of the pear. This coring action is illustrated in the figure at the lower end of the 45° line.

The mechanism for driving the coring and shaping knives has previously been described.

As the turret moves from the 25° line, the coring knives 95 are returned 90° to their positions shown in the diagram directly below the 45° line and lock the seed pod halves in the coring and shaping unit while the pear halves are discharged from the machine. Between the 65° and 90° lines clamp segments 100 are opened to release the pear halves. Following this action the pear halves are discharged from the coring and shaping unit by actuating the coring unit blade 74b first to one side and then the other thus positively pushing the fruit halves from the coring and shaping unit while at the same time retaining the seed pod halves locked between the coring knives 95. The pear halves fall into the discharge chute 189 and are thereby conveyed out of the machine completely peeled, stemmed, cored and shaped.

The coring knives 95 are rotated to unlock the seed pods while the turret is turning from the 145° to the 155° lines and when released the seed pods fall onto and are discharged from the machine by the discharge chute 189a. By this arrangement the seed pods are discharged separate from the machine and are not mixed with the pear halves.

During the coring and shaping and discharging operations the transfer unit E remains in its elevated position as indicated by the clamp travel lines extending from 0° to 180° in both Figures 56A and 56C and thereafter the transfer unit moves downwardly as indicated by the downward inclination of the clamp travel line between 180° and 237½° lines and after a short unit and cam track 141 is for the operation of the clamp segments 100.

The cam tracks 126 and 141 formed in stationary cam segment 127 are arranged to give uniform downward travel to the transfer unit and clamp segments 100 as indicated by downward slope of the cam travel line between 180° and the 237½° lines (Fig. 56B). At this point the cam rollers 125 and 140 enter the corresponding tracks 126 and 141 formed in the movable segment 129.

Between the 245° and 260° lines the movable cam segment 129 is moved downwardly as indicated by the abrupt downward inclination of the clamp travel line. This downward movement brings the clamp segments 100 of the transfer unit into position to engage the peeled pear and between the 260° and 275° lines it will be noted that cam track 141 is given an upward inclination. This is for the purpose of releasing the clamp segments 100 into clamping engagement with the fruit and thereafter the movable segment is moved upwardly as indicated by the abrupt inclination of the clamp travel line between 275° and 290° lines. This rapid travel of the transfer unit is made possible by the compound cam system even though it appears abrupt in the chart of Fig. 56B.

Cam tracks 126 and 141 in the stationary cam segment 127 are spaced to receive the cam rollers 125 and 140 as they leave the movable cam segment 129 between the 290° and 300° lines and the cam tracks 126 and 141 are inclined upwardly between the 300° and 355° lines in order to give further travel to the pear carried by the transfer unit to position the pear into accurate register with the coring and shaping unit F. From this point the two cam tracks 126 and 141 continue in parallel relation until they reach the 65° line. Between the 65° and 90° lines shown, the cam track 141 is inclined downwardly to open the clamp segments 100 for discharging the pear from the transfer unit.

The third cam system operates the impaling blade 4 and includes a primary cam 37 which cam is mounted in the cam cluster 21 and makes one full revolution for each 60° of turret travel. The primary cam ring 37 includes two cam tracks 38 and 39. The cam roller 53 travels in cam track 38 and angularly spaced cam rollers 51 and 52 travel in cam track 39.

The secondary cam includes two stationary segments 63 and 64 and three movable segments 54, 55 and 56. Each of the movable cam segments of the secondary cam is connected to its related cam roller of the primary cam in the manner previously described. The secondary cam with its three movable segments and two stationary segments is provided with a single cam track in which the cam rollers 91 carried by the impaling blade cross heads 66 travel. As each cam roller 91 travels through cam track 68 in the movable segment 56 of the secondary cam, the primary cam causes segment 56 to make a rapid downward movement to thrust impaling blade 4 into the fruit held in the feed unit centering ring and then to rapidly lift the impaling blade to in turn lift the fruit out of the centering ring; this action takes place between the 350° and 10° lines of Figures 56B and 56A.

Thereafter cam roller 91 travels into cam track 69 of the movable cam segment 54 and thereupon the primary cam moves segment 54 downwardly to lower the impaled fruit into peeling register, which action takes place between the 35° and 45° lines in Figure 56A.

From the movable cam segment 54 cam roller 91 travels into the cam track 70 of the stationary segment and while traveling through cam track 70 maintains the impaling blade 4 in peeling register during the three peeling operations. From the stationary segment 64 cam roller 91 then travels into cam track 71 of the movable cam segment 55 whereupon the segment 64 is moved upwardly by its related primary cam to elevate the impaling blade to present the fruit to the transfer unit E, this action taking place between the 195° and 200° lines in Figure 56A.

After the movable cam segment 55 has been raised by its primary cam to bring its cam track 71 into register with cam track 67 of the stationary cam segment 63, cam roller 91 passes into cam groove 67. This action taking place between the 185° and 215° lines. The cam track in the stationary cam segment 63 is not inclined between the 215° and 257½° lines. Thereafter the cam track is inclined upwardly as indicated on the impaling blade cam track line between the 257½° and 287½° lines.

From the 287½° line to the 315° line the cam track 67 is horizontal and from the 315° to the 340° line cam track 67 inclines downwardly as indicated by the impaling blade butt stop travel line between these two points. From the fixed cam segment 63 the roller again passes into the movable cam segment 56 to start a new cycle of operation.

The compound cam system for operating impaling blade 4 in effect includes three primary cams operating three separate movable segments in a single secondary cam whereby rapid timed operations of the impaling blade to impale the fruit held by the feed unit centering ring 1 to lift the impaled fruit from the centering ring and then to rapidly lower the impaled fruit into peeling register, to maintain the fruit in peeling register during the peeling operation and then by a third movable cam segment to lift the peeled pear from its peeling position to register with the transfer unit C and finally to gradually raise the impaling blade 4 to effect the ejection of the stem fibers from the impaling blade tube 5 thereafter returning the impaling blade to its initial starting position.

From the above description of the compound cam systems it will be appreciated that all three of these systems have been compactly nested within the limited space available in the machine and that each of the compound cam systems provides relatively long smooth strokes for their respective operating units during relatively limited circular advances of the main operating turret.

Having fully described my invention, it is to be understood that I do not wish to be limited to the details herein set forth, but my invention is of the full scope of the appended claims.

I claim:

1. In a machine of the character described, the combination of a rotating member, a reciprocating member, a cam means operatively connecting the rotating member with the reciprocating member, the said cam means including a primary cam means and a secondary cam means, means for driving the primary cam through a multiple of rotations for each revolution of the rotating member, a cam follower within the cam path of the primary cam and operatively connected with the reciprocating member, the secondary cam having a movable cam segment, a cam follower arranged to follow in the cam paths of the secondary cam and the movable cam segment, and means for driving the movable cam segment of the secondary cam from the primary cam during the travel of the secondary cam follower through the cam path of the movable cam segment.

2. In a machine of the character described, the combination of a rotating member, a reciprocating member operatively carried by the rotating member, a cam means, a cam follower operated by the cam means and connected with the reciprocating member, the said cam means including a primary cam, a secondary cam, the secondary cam having relatively non-reciprocating and reciprocating segments, a cam follower for the secondary cam, means for driving the reciprocating element of the secondary cam from the primary cam while the secondary cam follower is in engagement with the reciprocating element of the secondary cam, and means for driving the rotating member.

3. In a machine for processing fruit, the combination of a rotating turret, a means within the turret and having reciprocating movement and operable to carry out a step in the processing of the fruit, a compound cam mechanism operatively connected with the turret and operated thereby for actuating the reciprocating member, the compound cam means including a primary cam means and a secondary cam means, the secondary cam means having relatively reciprocating and non-reciprocating segments in which a cam path is provided, a cam follower operating in the cam path and connected with the reciprocating member, and means for actuating the reciprocating segment of the secondary cam from the primary cam while the cam followers are operating in the reciprocating element of the secondary cam.

4. In a machine of the character described, the combination of a rotating turret, a fruit processing element within the turret and having a reciprocating movement during a portion of rotation of the rotating turret, cam actuating means for the reciprocating member, means for driving the cam actuating means through a multiple number of revolutions for each revolution of the rotating turret, the said cam actuating means including a cam ring having reciprocating and non-reciprocating segments within which segments a cam path is provided, a cam follower operating within the cam path and connected with the fruit processing element, and means within the turret for driving the reciprocating cam segment while the cam follower is in the cam path of the reciprocating segment for reciprocating the fruit processing element.

5. In a machine for processing fruit, a rotary turret, a fruit processing element within the turret adapted to effect a processing operation upon a fruit, means for actuating said fruit processing element including a cam mechanism, said cam mechanism including a primary actuator and a secondary actuator, means for actuating the primary actuator through a multiple of revolutions for each revolution of the rotary turret, the secondary actuator including a cam ring having a stationary segment and a movable segment, means for actuating the movable segment from the primary actuator, and means for operably connecting the movable segment of the secondary actuator with the fruit processing means during the actuation of the movable segment.

6. In a machine of the character described, the combination of a rotating turret, a reciprocating member, cam means operatively connecting the rotating turret with the reciprocating member for actuation of the latter, the said cam means including a cam element having a reciprocating segment and a stationary segment, a cam path formed in the said segments, a cam follower within the cam path connected with the first stated reciprocating member, means for actuating the movable segment of the cam means while the cam follower is in operative engagement in the cam path of the movable segment through a multiple of cycles of operation for each revolution of the rotating member.

7. In a machine for processing fruit, the combination of an operating turret having peeling means therein, said peeling means including a stemming tube on which a fruit to be peeled is impaled and upon which the fruit is supported during the peeling operation, a plurality of peeling knives adapted to have relative reciprocation and rotation with reference to the fruit, means for actuating the peeling knives to move the peeling knives through a succession of reciprocating strokes with reference to the pear through a portion of movement of the operating turret, said means including a primary cam ring carried in operative relation to the operating turret, a secondary cam ring, means for driving the secondary cam ring through a multiple of revolutions for each revolution of the turret, the primary cam ring having a reciprocating cam ring segment and a stationary cam ring segment providing a cam path, a cam follower operating within the cam path and connected with the peeling knives, and means for reciprocating the reciprocating cam ring segment from the secondary cam.

8. In a fruit processing machine, the combination of the means for supporting a fruit, including a stemming tube and a fruit butt stop means, the fruit butt stop means being formed of two segments and operable to determine the position of a fruit within the machine by engagement with the end of a fruit supported upon the stemming tube, and means operable to actuate the butt stop segments to move the same to and from fruit-engaging position, said means including a slide block, means for supporting the slide block, means connecting the slide block with the butt stop segment for actuating the same to and from fruit-engaging position, a cam blade having a cam track formed therein, a cam roller carried by the slide block, means for actuating the cam blade to move the cam track with relation to the cam roller, the cam track of the cam blade having a straight cam track section, and means for moving the stemming tube and butt stop together with a fruit supported therebetween at which time the cam roller is positioned within the straight section of the cam track of the cam blade whereby the butt stop is maintained in fruit-engaging position.

9. In a machine for processing fruit, the combination of a continuously rotating turret, means operated within the turret for removing the stem fibre, means within the turret for peeling the fruit, means for halving the fruit, means for coring the fruit, and a transfer unit for transferring the fruit to and from the operating means, said transfer unit including means for gripping and supporting the fruit during transfer, and means within the turret for actuating the said transfer and gripping means comprising a compound cam mechanism, including a cam means for actuating the gripping means, a cam means for actuating the transfer unit, said cam means including a primary cam ring, means for driving the primary cam ring through a plurality of revolutions for each revolution of the rotating turret, a secondary cam ring having a pair of cam tracks and including a reciprocating cam segment containing a segment of said cam tracks, cam followers mounted within the cam tracks and operable to actuate the transfer unit from one position to another within the turret in timed relation with the operation of the stem fibre removing means, the peeling unit, the halving means and the coring means, and operable to open and close the fruit gripping means, and means connecting the primary cam means with and for actuating the movable segment of the secondary cam means.

10. In a fruit processing machine, a continuously rotating turret, a means for gripping a fruit including an impaling blade, a butt stop operatively related to the impaling blade, and adapted to stop the fruit in definite position on the impaling blade, a peeling unit to which the fruit is presented on the impaling blade so stopped in position, means for actuating the impaling blade to impale the fruit, and present and remove the same from the peeling unit, and means to actuate the butt stop to fruit-stopping position with relation to the impaling blade and to remove the same from stopping position therewith, said means including a primary cam, a secondary cam, the secondary cam providing a cam track and being composed of stationary segments and a plurality of segments movable relative to the stationary segments, means operated by the primary cam means for moving the cam segments in timed relation, and cam followers operated by the cam track of the secondary cam and connected with the transfer unit and the butt stop for actuating the same in timed relation with the peeling mechanism.

11. In a machine for processing fruit, the combination of a turret, a plurality of peeling units mounted in and carried by the turret, means for reciprocating the peeling units during a portion of the rotation of the turret, means for supporting a fruit with relation to the peeling units, means for effecting a relative rotation of the fruit supporting means and peeling units, the means for reciprocating the peeling units including a primary cam mechanism and a secondary cam mechanism, and means for driving said cam mechanism through a plurality of revolutions for each revolution of the turret, the secondary cam mechanism including a cam ring having a movable segment, and means operated from the primary cam mechanism for actuating the movable cam segment of the secondary cam mechanism.

12. In a machine for processing fruit, the combination of a continuously rotating turret, means mounted within the turret for peeling fruit, means for halving the fruit, means for coring the fruit and a transfer unit for transferring the fruit to and from these operating means, said transfer unit including means for gripping and supporting the fruit during transfer, and means within the turret for actuating the said transfer means and the gripping means thereof, said means including a primary cam mechanism and a secondary cam mechanism, the secondary cam mechanism including a stationary and a movable cam segment, the said segments together forming a cam ring having a cam path therein, cam rollers mounted within the cam paths and connected with the gripping means and transfer means respectively for actuating the same, and means connected with and operated by the primary cam and connected with the cam segments for actuating the same in timed relation with each other and with the travel of the cam rollers through the cam ring of the secondary cam.

13. In a machine of the character described, the combination of a rotating member, a reciprocating member, a cam means operatively connecting the rotating member and the reciprocating member, the said cam means including a primary cam means and a secondary cam means, means for driving the primary cam through a complete revolution during a fraction of revolution for each revolution of the rotating member, a cam follower within the cam path of the secondary cam and operatively connected with the reciprocating member, the secondary cam having a movable segment, and means for driving the movable segment of the secondary cam from the primary cam, while the cam follower is in operative engagement with the cam path thereof.

14. In a compound cam system for giving an actuator a longer stroke for a predetermined distance of cam travel than would be possible to obtain wherein the slope of the cam track for such predetermined distance is confined to practical operating limits for smooth operating characteristics including the combination of a secondary cam having reciprocating and non-reciprocating segments and related cam tracks for said segments, the pressure angles of the sloping portions of the segment cam tracks confined within practical operating limits for smooth operating characteristics of an actuator operated thereby, an actuator operatively engaging said cam track, a primary cam for reciprocating the reciprocating cam segment while the actuator is under control of said cam track to give the actuator a stroke longer than would be possible to obtain for the extent of travel provided by the effective length of the reciprocating cam track, and wherein the cam track slope is confined within said practical operating limit.

15. In a compound cam system for giving to an actuator a longer stroke for a predetermined distance of cam travel than would be possible to obtain from a cam track of corresponding length wherein the slope of the cam track is confined to practical operating limits for smooth operating characteristics, including the combination of a secondary cam having reciprocating and non-reciprocating segments and related cam tracks therefor, an actuator operatively engaging said cam track for operation thereby, and a primary cam for reciprocating the reciprocating segment while the actuator is under control of its cam track to give to the actuator a stroke longer than would be possible to obtain from a cam track slope confined within the operating limits for smooth operating characteristics of the actuator.

16. In a cam system for giving to an actuator a longer stroke for a predetermined distance of cam length than would be possible to obtain from a cam track of corresponding length, wherein the slope of the cam track is confined to practical operating limits for smooth operating characteristics, including in combination a secondary cam having reciprocating and non-reciprocating segments and related cam tracks therefor, an actuator operatively engaging said cam track for operation thereby, a primary cam for reciprocating the reciprocating segment while the actuator is under control of its cam track, and a driving mechanism for causing relative movement between the actuator and secondary cam to rotate the primary cam a full revolution while the actuator is under control of the reciprocating segment of the secondary cam to give the actuator a stroke longer than would be possible to obtain from the cam length represented by the reciprocating segment without increasing the cam slope thereof beyond practical operating limits for smooth operation.

17. In a cam system for giving to an actuator a longer stroke for a predetermined distance of cam length than would be possible to obtain from a cam track of corresponding length, wherein the slope of the cam track is confined within practical operating limits for smooth operating characteristics, including in combination a secondary cam having reciprocating and non-reciprocating segments and related cam tracks therefor, an actuator operatively engaging said cam tracks for operation thereby, a primary cam having an effective cam track of greater length than the cam track of said reciprocating segment, the slope of such cam track being within practical operating limits, an operating connection between the primary cam track and the reciprocating segment of said secondary cam, and a driving mechanism for causing relative movement between the actuator and secondary cam, and for rotating the primary cam at a speed of rotation necessary to cause the effective track portion thereof to traverse said operating connection while the actuator is under control of said reciprocating cam segment.

18. In a cam system for giving to an actuator a longer stroke for a predetermined distance of cam length than would be possible to obtain from a cam track of corresponding length wherein the slope of such cam track is confined within practical operating limits for smooth operating characteristics, including in combination a secondary cam having reciprocating and non-reciprocating segments and related cam tracks therefor, the cam track for the reciprocating segment having a cam slope confined within practical operating limits, an actuator operatively engaging said cam tracks for operation thereby, a primary cam having a cam track the slope thereof being within practical operating limits, an operating connection between the primary cam track and the reciprocating segment of said secondary cam, and a driving mechanism for causing relative movement between the actuator and the secondary cam and for rotating the primary cam to cause longitudinal movement of the reciprocating cam segment while the actuator is under control thereof for giving to the actuator a longitudinal stroke determined by the combined effect represented by the cam track slopes of both the reciprocating cam segment and primary cam.

19 In a macine, the combination of a rotary turret, a cam having stationary and movable segments, a plurality of actuating elements operatively carried by the turret and arranged for the operation thereof to be under control of the stationary and movable cam segments, a driver cam, an actuating connection between the driven cam and the movable cam segment, and a driving connection for rotating the driven cam through a plurality of revolutions for each revolution of the turret, and timed to cause the driven cam to actuate the movable cam segment each time one of the actuating elements moves into operative engagement with said movable cam segment.

20. In a machine, the combination of a rotary turret, a plurality of actuating elements operatively carried by the turret, a cam having stationary and movable segments, operating connections operatively connecting each actuating element with the cam, a driven cam, an actuating connection between the driven cam and movable cam segment, and a driving mechanism for rotating the turret and for rotating the driven cam through a plurality of revolutions for each revolution of the turret, and timed to cause the driven cam to actuate the movable cam segment each time one of the operating connections moves into operative engagement with said movable cam segment.

21. In a machine, the combination of a rotary turret, an actuating element operatively carried by the turret, a cam having stationary and movable segments, an operating connection operatively connecting the actuating element with the cam, a driven cam, an actuating connection between the driven cam and movable cam segment, and a driving mechanism for rotating the turret and for rotating the driven cam through a plurality of revolutions for each revolution of the turret, and timed to cause the driven cam to actuate the movable cam segment each time the operating connection moves into operative engagement with said movable cam segment.

22. In a machine, the combination of a rotary turret, an actuating element operatively carried by the turret, a cam having a stationary and a plurality of movable segments, an operating connection operatively connecting the actuating element with the cam, a driver for each movable cam segment, actuating connections between the drivers and movable cam segments, and a driving mechanism for rotating the turret and for operating the drivers through a plurality of operations for each revolution of the turret, and timed to cause the drivers to actuate the movable cam segments when the actuating element moves into operative engagement therewith.

23. In a machine, the combination of a rotary turret, a plurality of actuating elements operatively carried by the turret, a cam having stationary and movable segments, a plurality of operating connections, one for operatively connecting each actuating element with the cam and arranged to have some of the connections traversing the stationary segment of the cam while other of said connections are traversing the movable segment, a driven cam, an actuating connection between the driven cam and movable cam segment, and a driving mechanism for rotating the turret and for rotating the driven cam the same number of revolutions as there are actuating elements for each revolution of the turret, and timed to cause the driven cam to actuate the movable cam segment each time one of the operating connections moves into operative engagement with said movable cam segment.

GUY A. DUNN.

References Cited in the file of this patent

UNITED STATES PATENTS

| Number | Name | Date |
|---|---|---|
| 1,463,839 | Raabe | Aug. 7, 1923 |
| 1,831,786 | Duncan | Nov. 10, 1931 |
| 2,056,413 | Thompson et al. | Oct. 6, 1936 |
| 2,179,529 | Thompson | Nov. 14, 1939 |
| 2,343,098 | Thompson | Feb. 29, 1944 |
| 2,418,827 | Ewald | Apr. 15, 1947 |
| 2,447,640 | Dunn | Aug. 24, 1948 |
| 2,459,368 | Dunn | Jan. 18, 1949 |
| 2,526,712 | Thompson | Oct. 24, 1950 |